(12) United States Patent
Yi et al.

(10) Patent No.: US 10,383,113 B2
(45) Date of Patent: Aug. 13, 2019

(54) METHOD AND APPARATUS FOR PERFORMING BLIND DETECTION IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Hanbyul Seo, Seoul (KR); Hyangsun You, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 15/317,869

(22) PCT Filed: Jun. 12, 2015

(86) PCT No.: PCT/KR2015/005961
§ 371 (c)(1),
(2) Date: Dec. 9, 2016

(87) PCT Pub. No.: WO2015/190883
PCT Pub. Date: Dec. 17, 2015

(65) Prior Publication Data
US 2017/0127414 A1    May 4, 2017

Related U.S. Application Data

(60) Provisional application No. 62/161,205, filed on May 13, 2015, provisional application No. 62/093,416, (Continued)

(51) Int. Cl.
*H04W 72/04* (2009.01)
*H04W 16/14* (2009.01)
(Continued)

(52) U.S. Cl.
CPC ....... *H04W 72/0446* (2013.01); *H04L 5/0048* (2013.01); *H04L 5/0091* (2013.01);
(Continued)

(58) Field of Classification Search
None
See application file for complete search history.

(56) References Cited

U.S. PATENT DOCUMENTS 9,113,483 B2 * 8/2015 Zou ............... H04W 16/14
9,854,446 B2 * 12/2017 Kim ............... H04W 16/14
(Continued)

FOREIGN PATENT DOCUMENTS

CN    102342054 A    2/2012
CN    103503335 A    1/2014
(Continued)

OTHER PUBLICATIONS

"3GPP TS 36.211 V12.0.0 (Dec. 2013): 3rd Generation Partnership Project; Technical Specification Group Radio Access Network; Evolved Universal Terrestrial Radio Access (E-UTRA); Physical channels and modulation (Release 12)", 3GPP Organizational Partners, 2013, 120 pages.
(Continued)

*Primary Examiner* — Lonnie V Sweet
(74) *Attorney, Agent, or Firm* — Birch, Stewart, Kolasch & Birch, LLP

(57) ABSTRACT

A method and apparatus for determining a length of a physical downlink shared channel (PDSCH) (or, a partial subframe) in a wireless communication system is provided. A user equipment (UE) detects at least one of starting orthogonal frequency division multiplexing (OFDM) symbol or ending OFDM symbol of a PDSCH in an unlicensed carrier, and determines the length of the PDSCH in the unlicensed carrier based on the at least one of the starting
(Continued)

OFDM symbol or the ending OFDM symbol of the PDSCH in the unlicensed carrier. The UE may detect the at least one of starting OFDM symbol or ending OFDM symbol based on a physical downlink control channel (PDCCH) or a reference signal (RS) pattern.

8 Claims, 24 Drawing Sheets

Related U.S. Application Data filed on Dec. 18, 2014, provisional application No. 62/023,189, filed on Jul. 11, 2014, provisional application No. 62/011,091, filed on Jun. 12, 2014.

(51) Int. Cl.
    *H04L 27/26* (2006.01)
    *H04L 5/00* (2006.01)
    *H04L 27/00* (2006.01)

(52) U.S. Cl.
    CPC ...... *H04L 27/0006* (2013.01); *H04L 27/2611* (2013.01); *H04W 16/14* (2013.01); *H04W 72/042* (2013.01); *H04L 5/0051* (2013.01)

(56) References Cited

U.S. PATENT DOCUMENTS

| | | |
|---|---|---|
| 2013/0039284 A1 | 2/2013 | Marinier et al. |
| 2013/0315114 A1 | 11/2013 | Seo et al. |
| 2014/0036853 A1 | 2/2014 | Kim et al. |
| 2014/0036881 A1* | 2/2014 | Kim ........................ H04L 5/001 370/336 |
| 2014/0206362 A1 | 7/2014 | Xu et al. |
| 2014/0378157 A1* | 12/2014 | Wei ........................ H04W 16/14 455/454 |
| 2015/0296513 A1* | 10/2015 | Nogami ................. H04W 28/18 370/329 |
| 2016/0095114 A1 | 3/2016 | Kim et al. |
| 2017/0201985 A1* | 7/2017 | Wang .................. H04B 7/15528 |
| 2018/0175975 A1* | 6/2018 | Um ........................ H04L 1/1816 |

FOREIGN PATENT DOCUMENTS

| | | |
|---|---|---|
| CN | 103548398 A | 1/2014 |
| CN | 103688480 A | 3/2014 |
| EP | 2 693 819 A1 | 2/2014 |
| EP | 3240224 A1 | 11/2017 |
| JP | 2012-5299239 A | 11/2012 |
| JP | 2017-521958 A | 8/2017 |
| JP | 2017-535223 A | 11/2017 |
| WO | WO 2013/044525 A1 | 4/2013 |
| WO | WO 2013/068342 A1 | 5/2013 |
| WO | WO 2016/018125 A1 | 2/2016 |
| WO | WO 2016/070704 A1 | 5/2016 |
| WO | WO 2016/182955 A1 | 11/2016 |

OTHER PUBLICATIONS

"3GPP TS 36.300 V12.1.0 (Mar. 2014): 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP Organizational Partners, 2014, 209 pages.

Alcatel-Lucent Shanghai Bell., "LBT Enhancements for Licensed-Assisted Access," 3GPP TSG RAN WG1 Meeting #79, R1-144701, San Francisco, USA, Nov. 17-21, 2014, 5 pages.

\* cited by examiner

[Fig. 1]
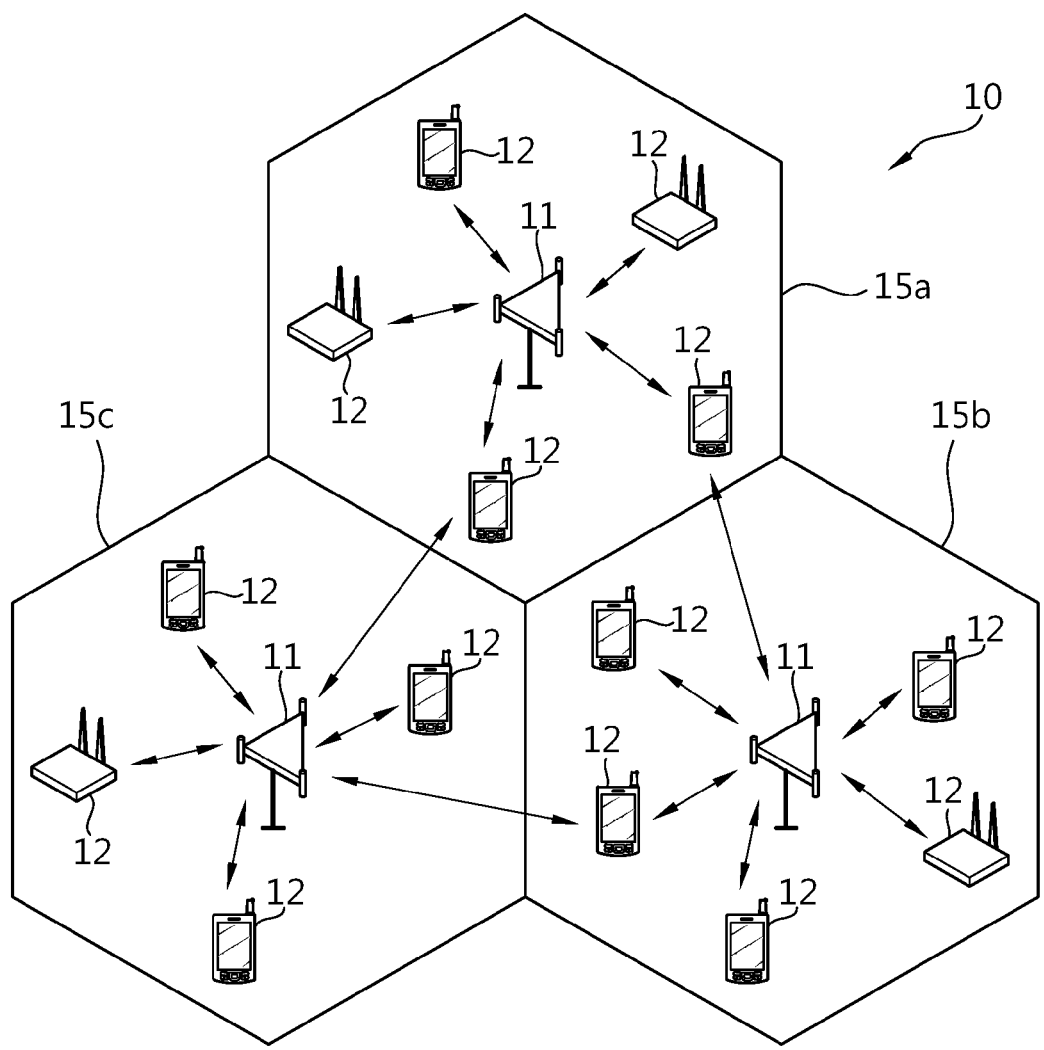
[Fig. 2]
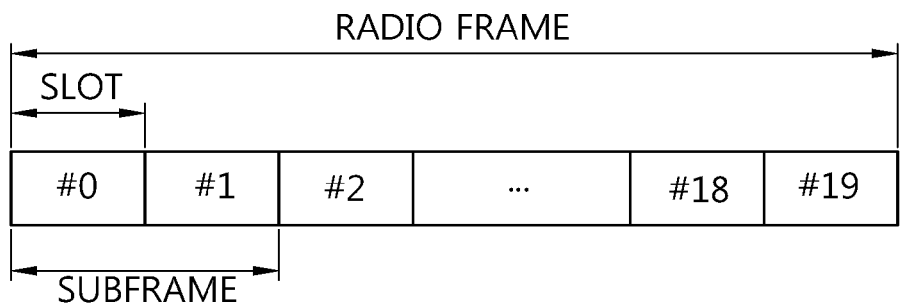

[Fig. 3]
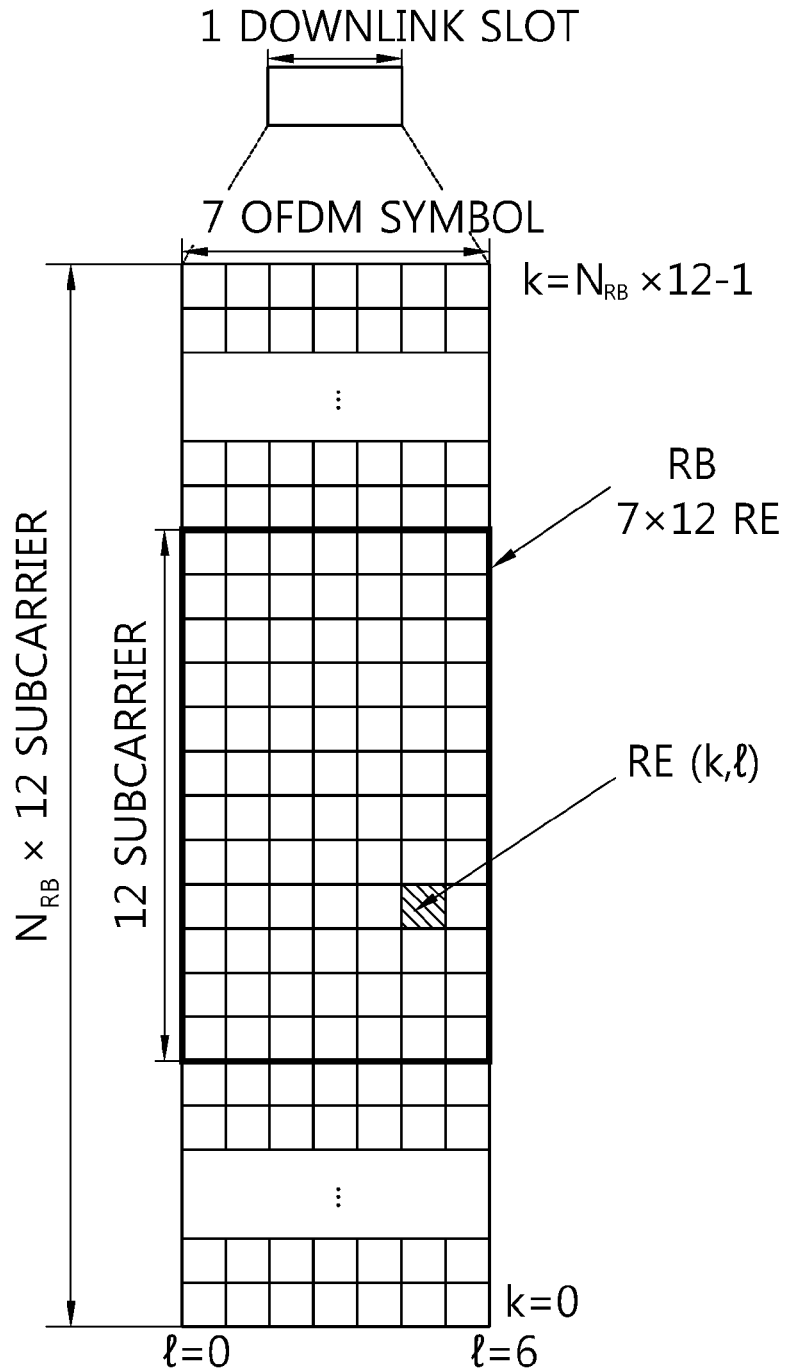

[Fig. 4]
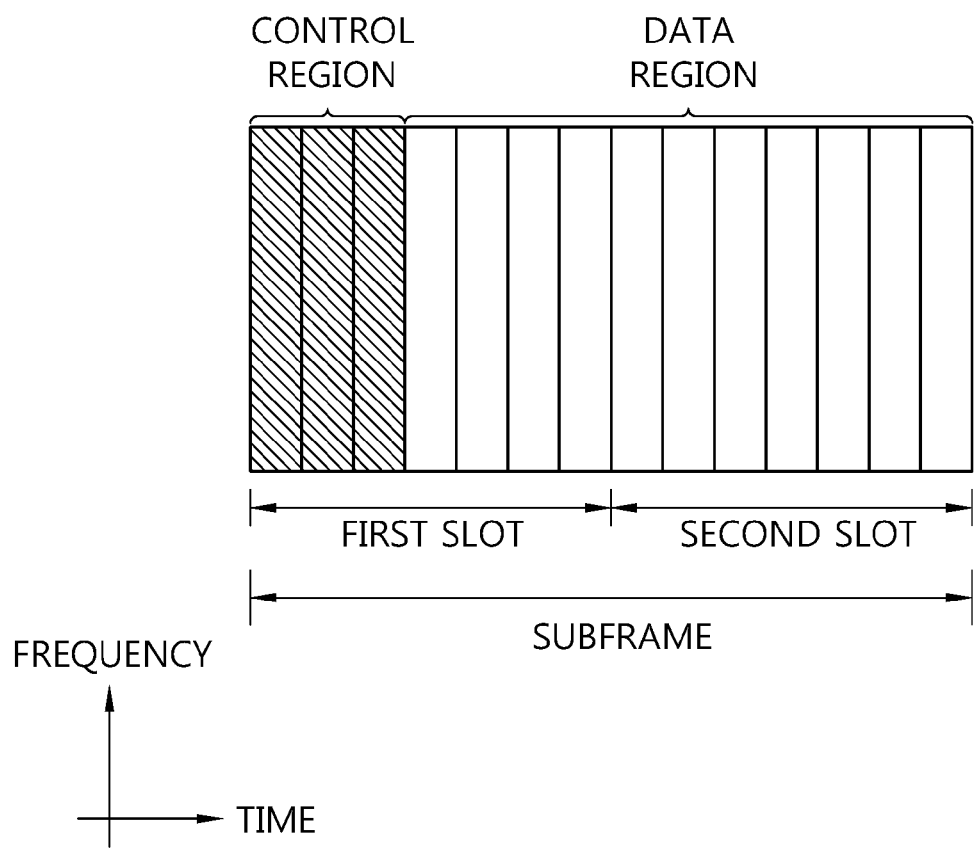

[Fig. 5]
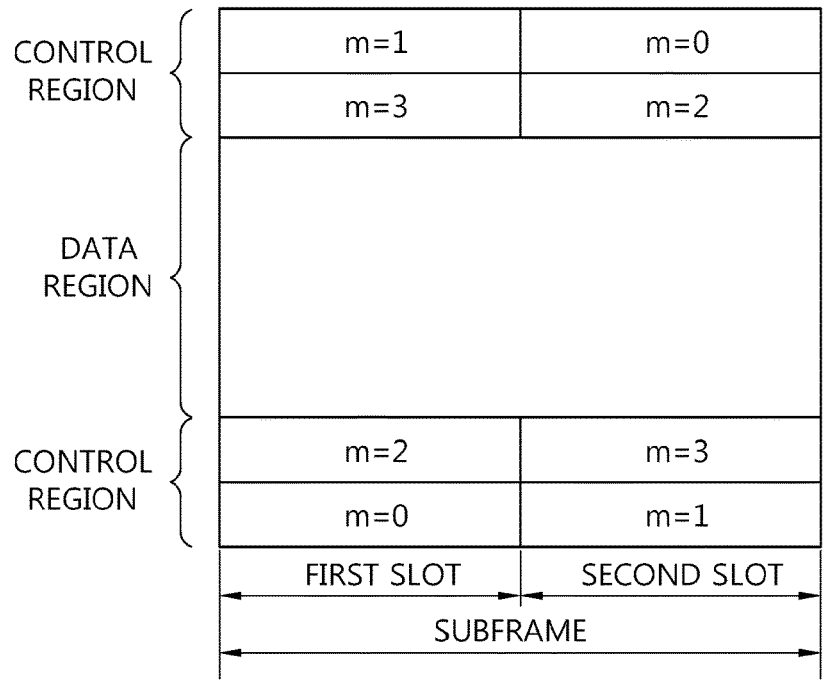
[Fig. 6]
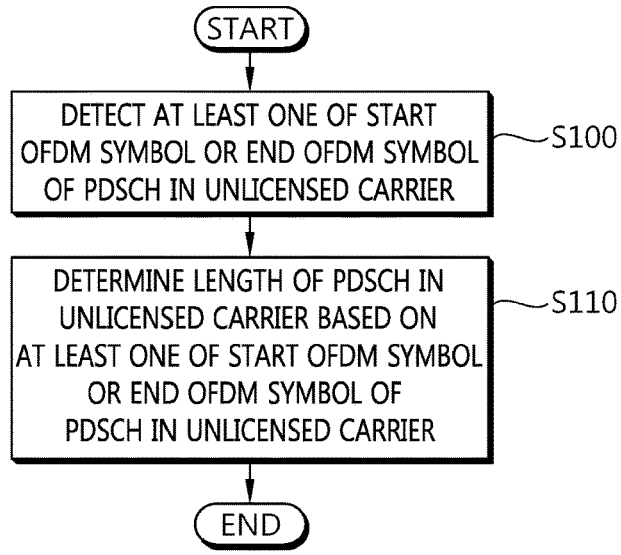

[Fig. 7]
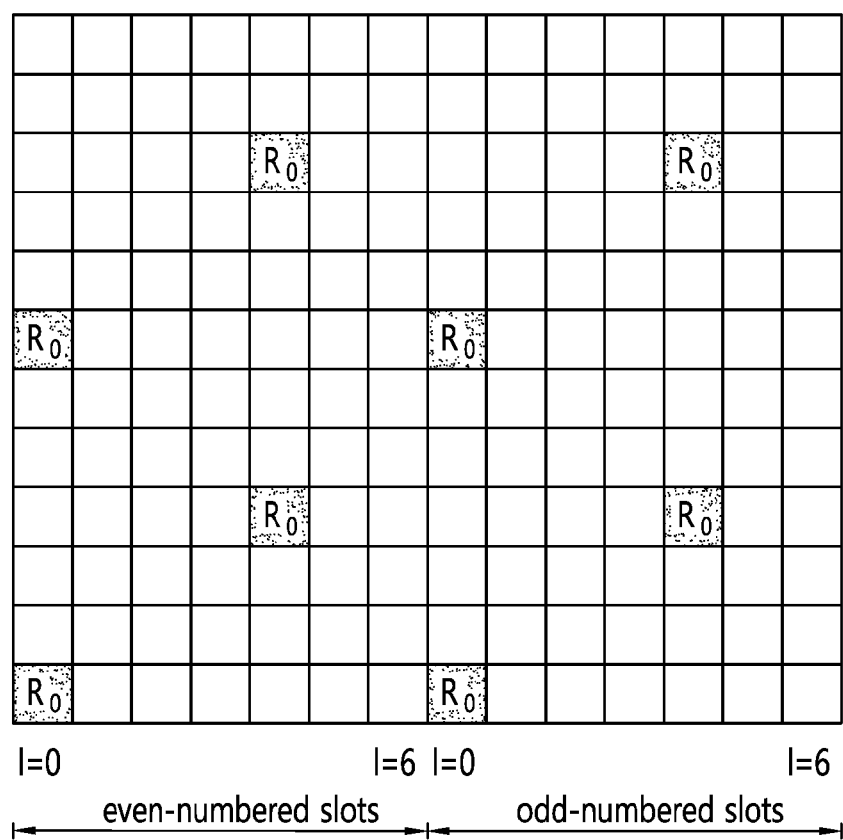

[Fig. 8]
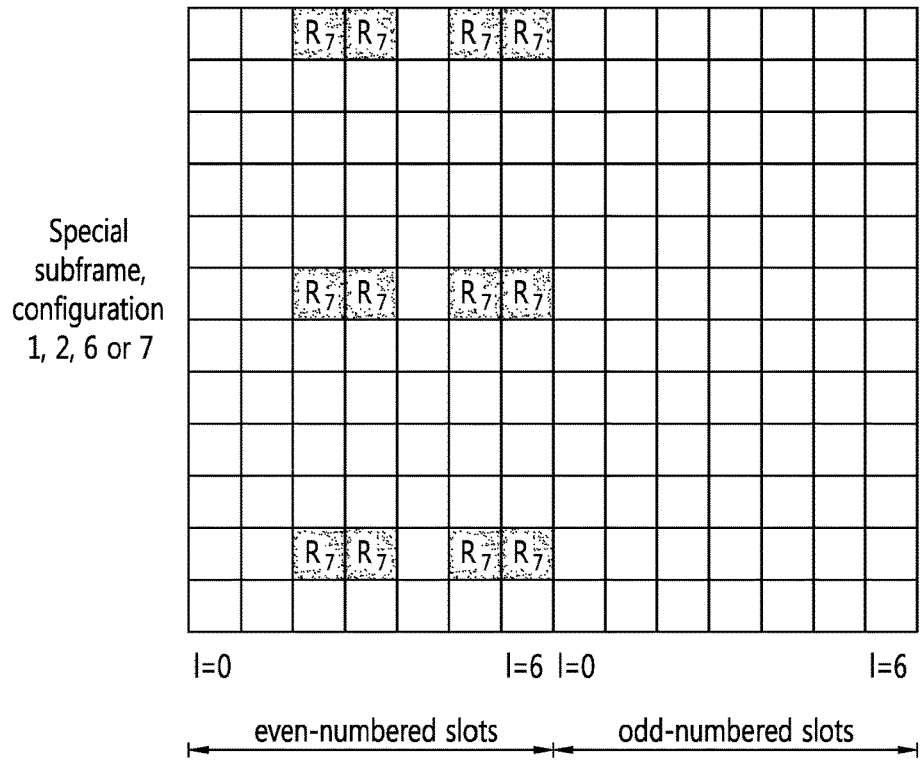
[Fig. 9]
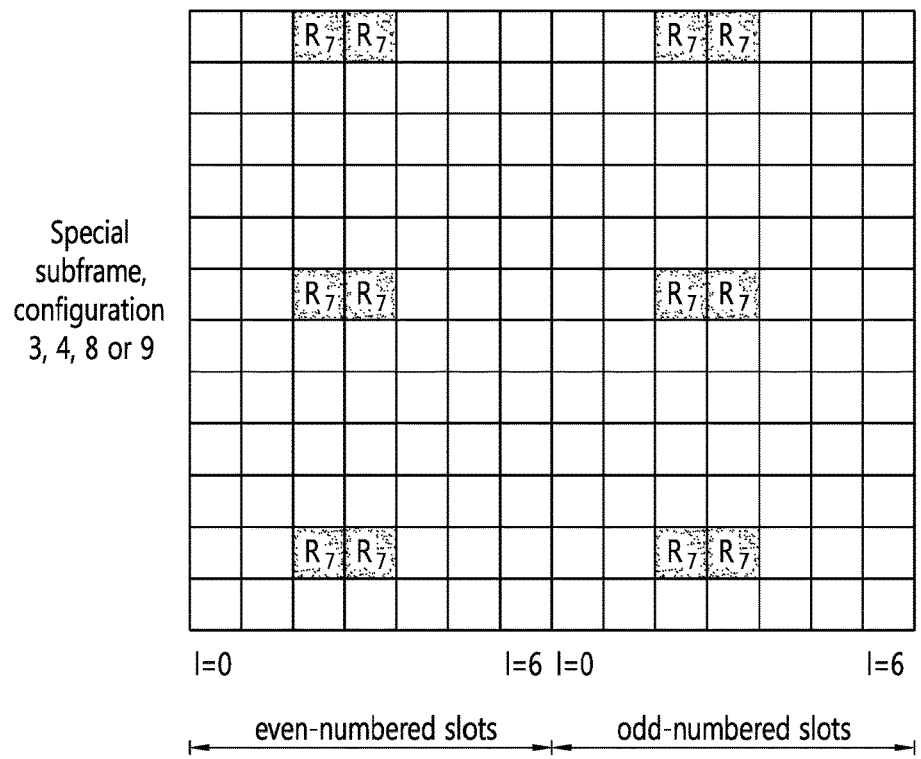

[Fig. 10]
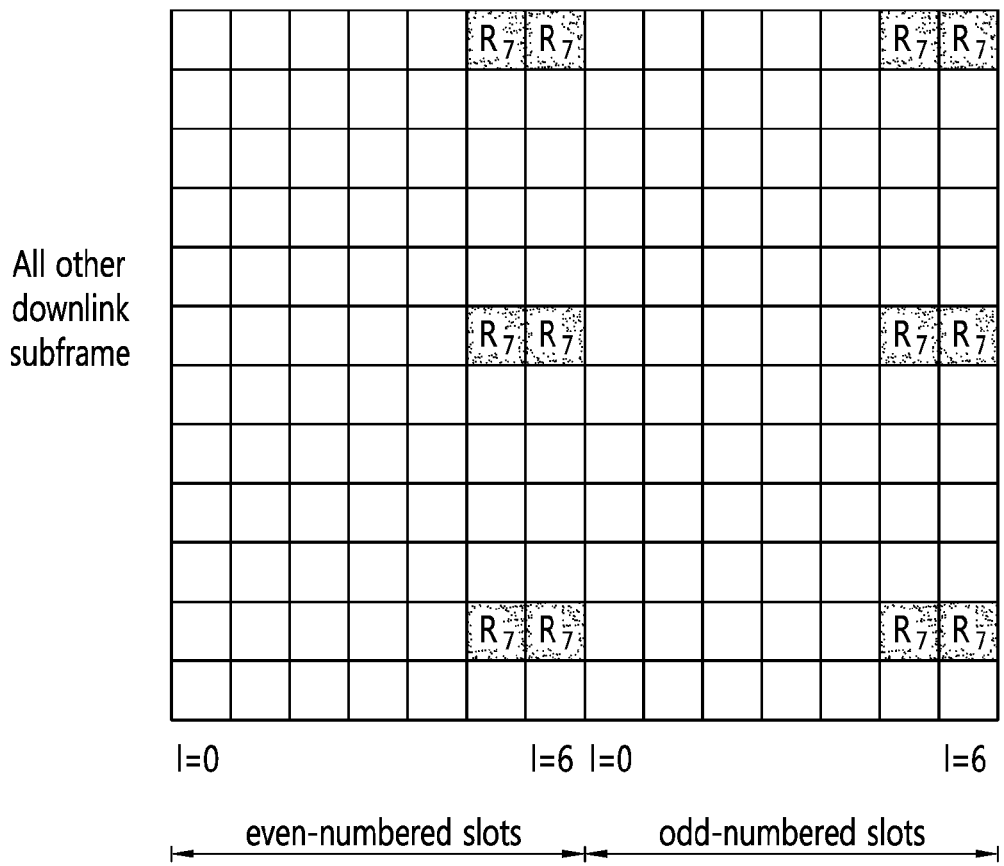

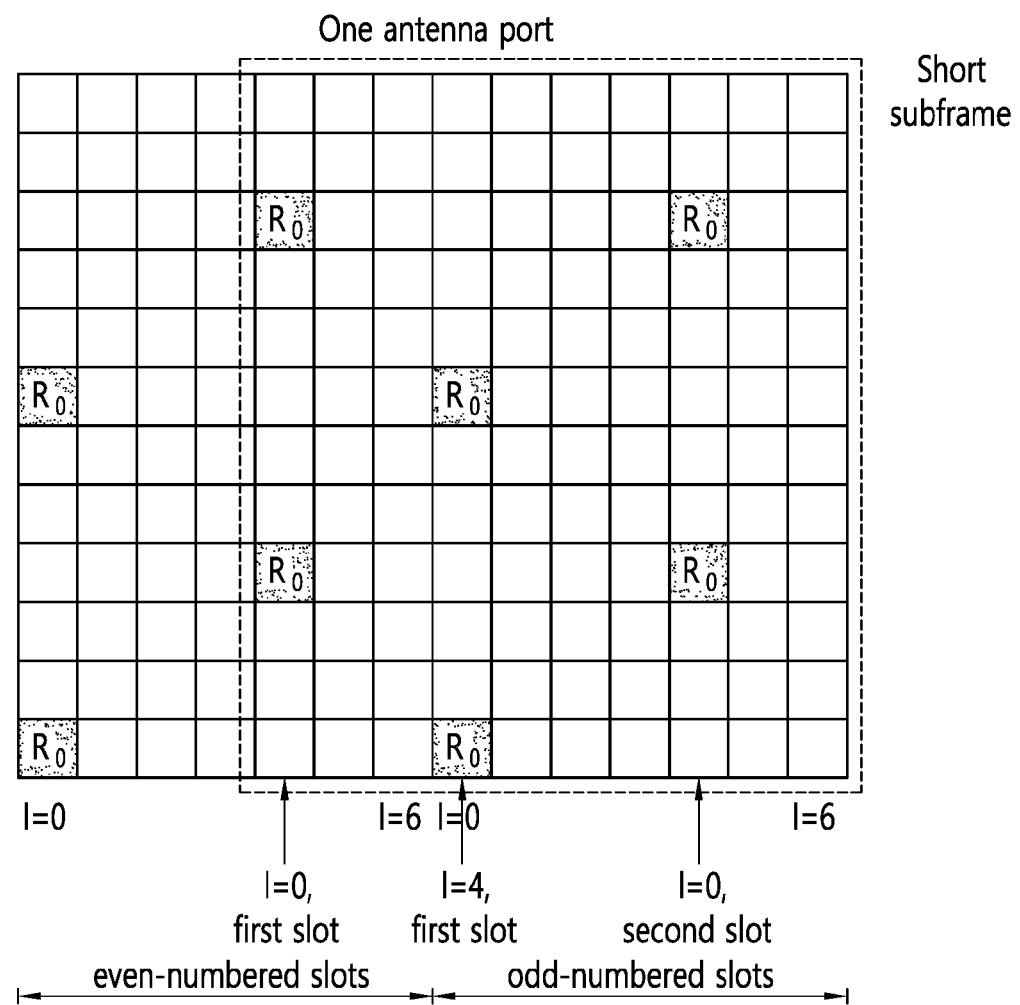
[Fig. 11]

[Fig. 12]
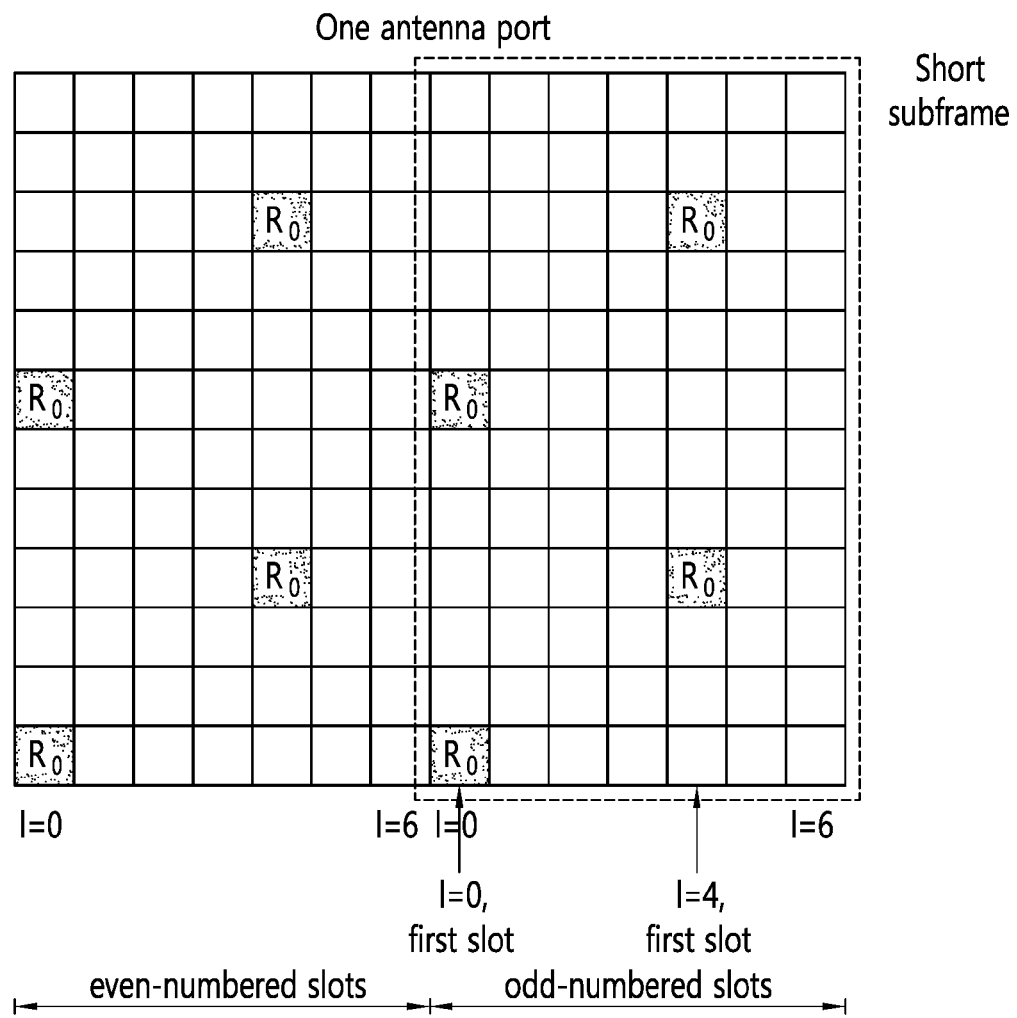

[Fig. 13]
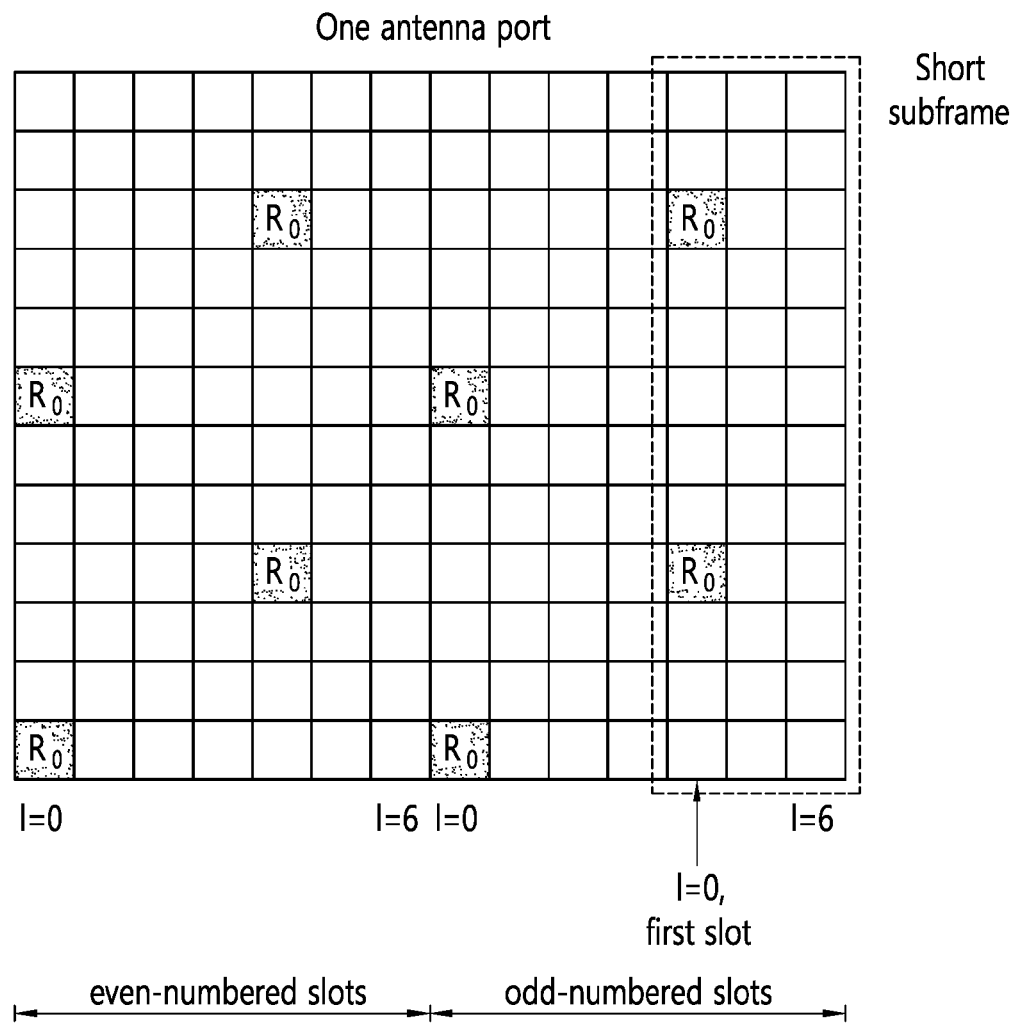

[Fig. 14]
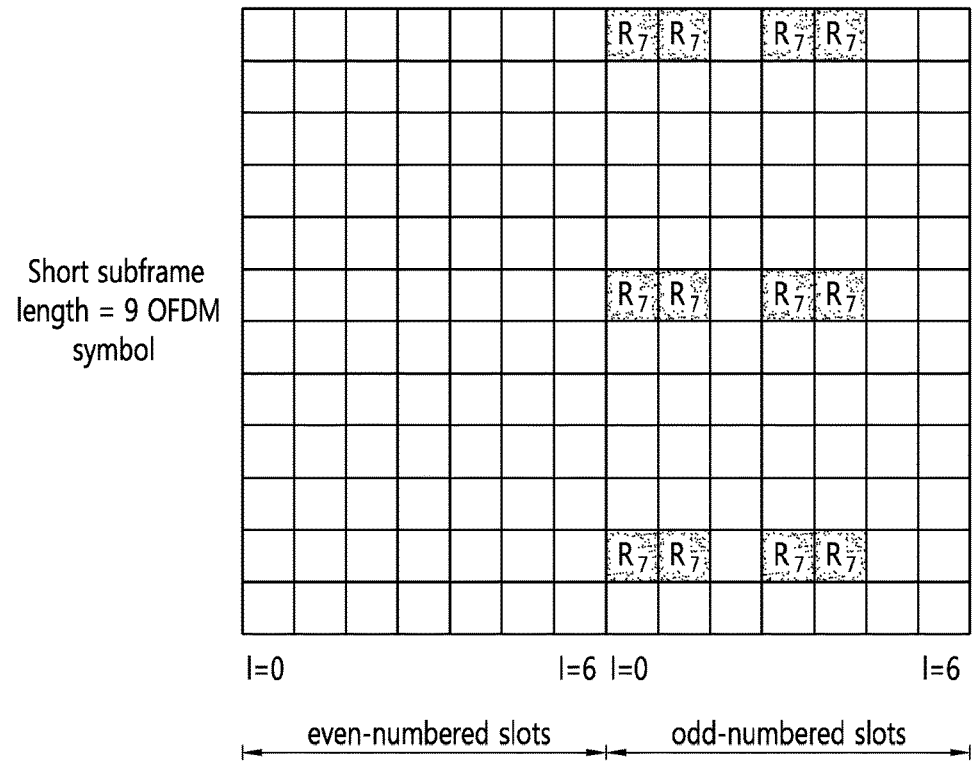
[Fig. 15]
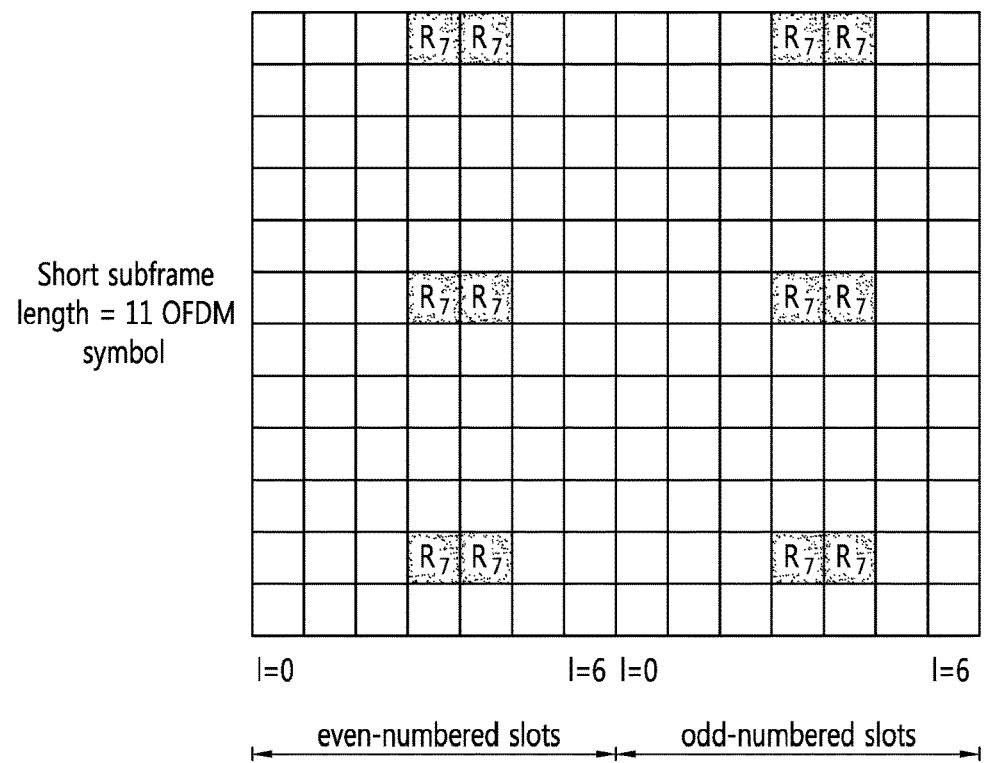

[Fig. 16]
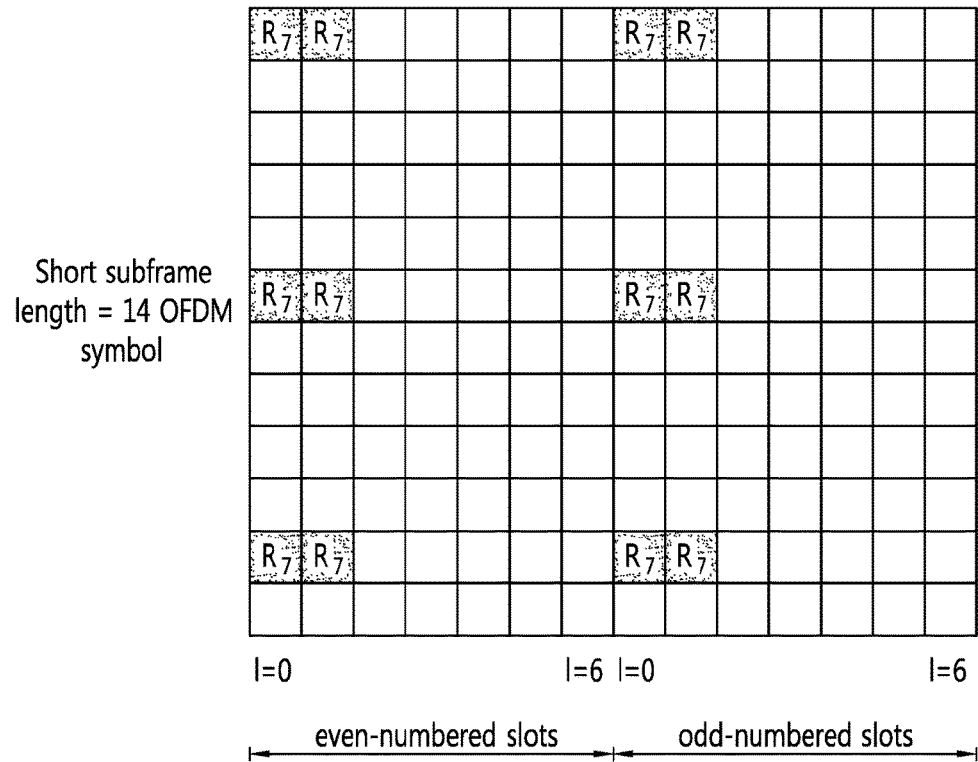
[Fig. 17]
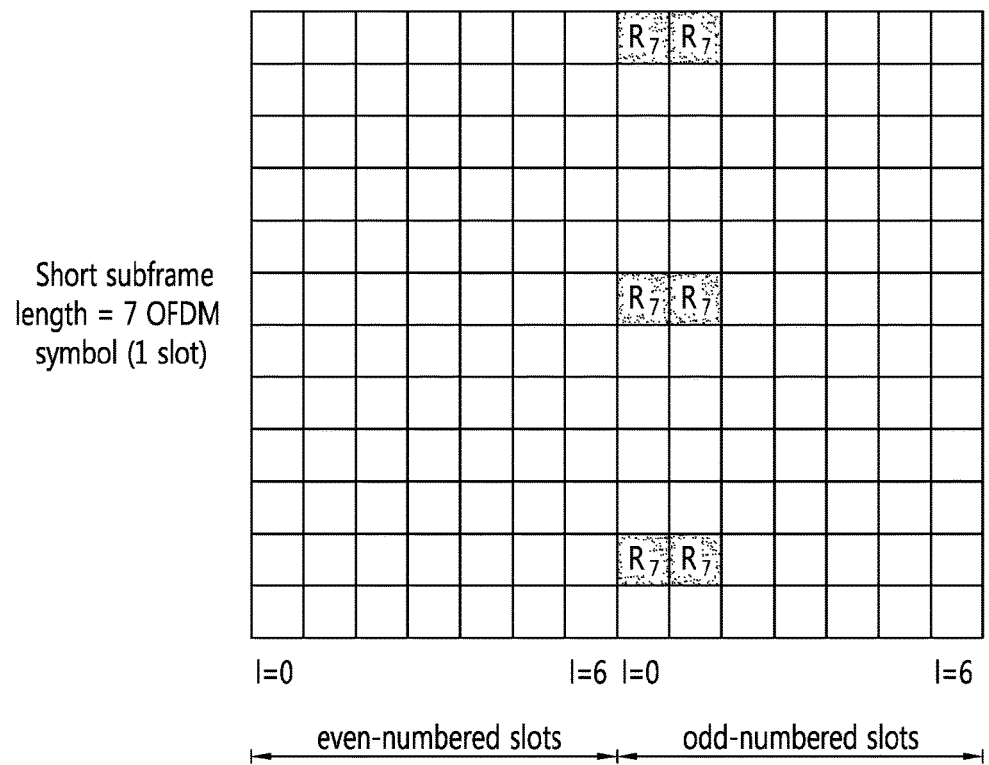

[Fig. 18]
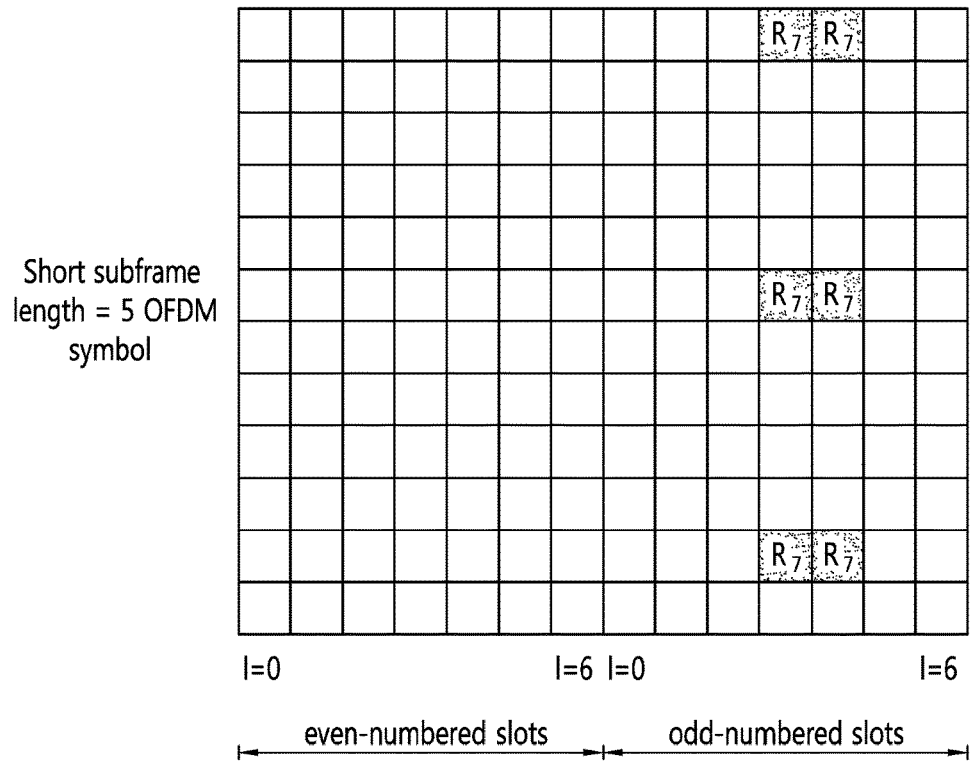
Short subframe length = 5 OFDM symbol
l=0  l=6 l=0  l=6
even-numbered slots  odd-numbered slots
[Fig. 19]
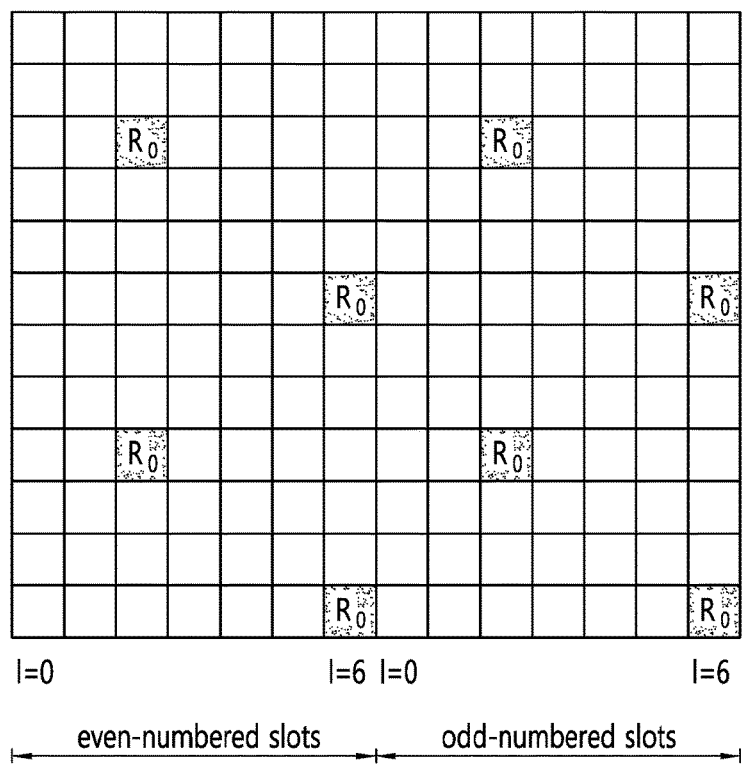
l=0  l=6 l=0  l=6
even-numbered slots  odd-numbered slots

[Fig. 20]
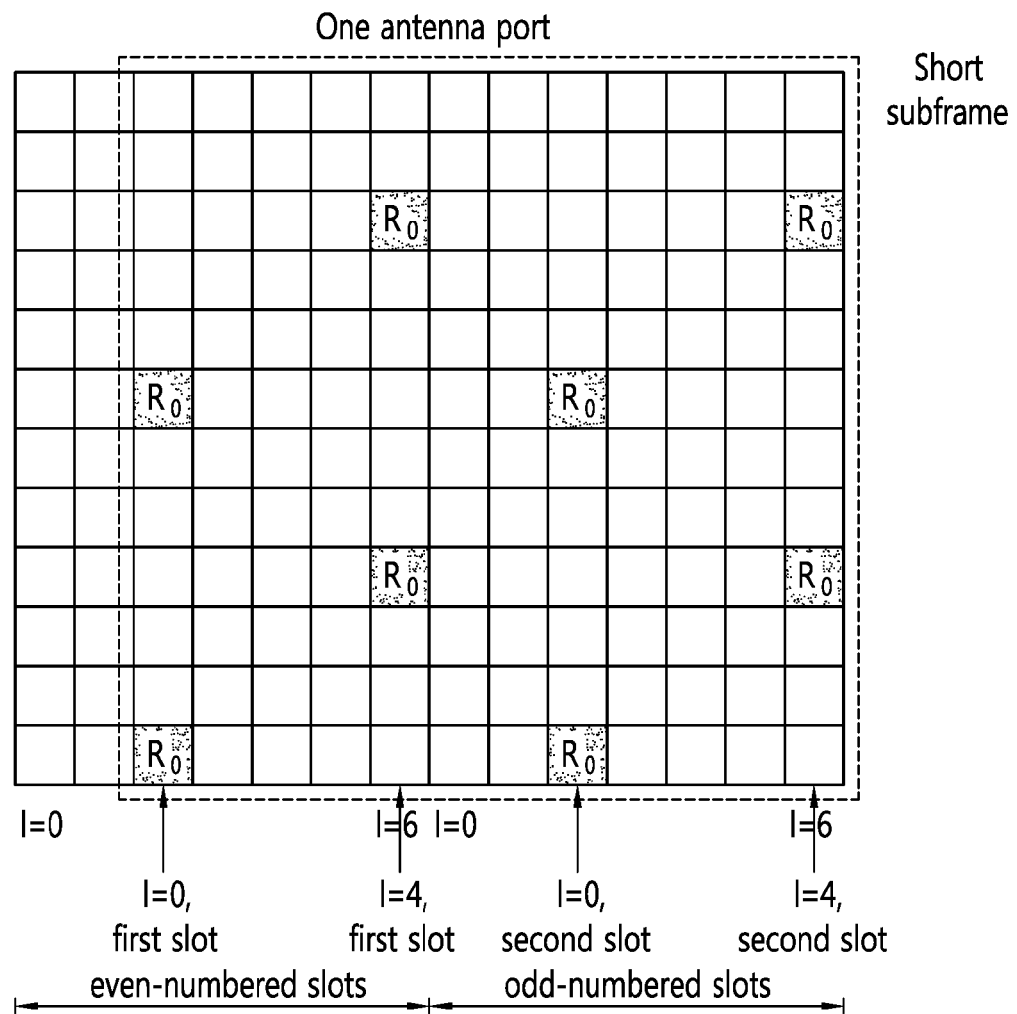

[Fig. 21]
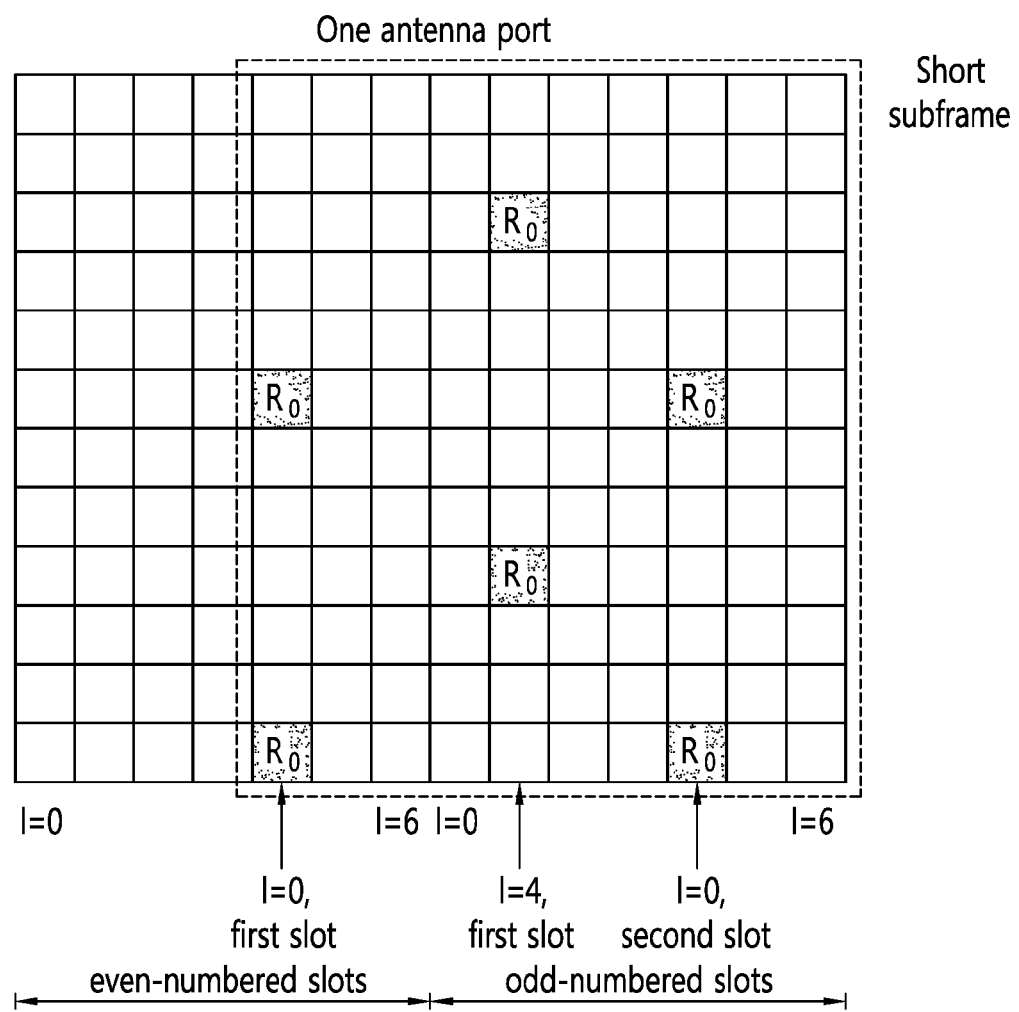

[Fig. 22]
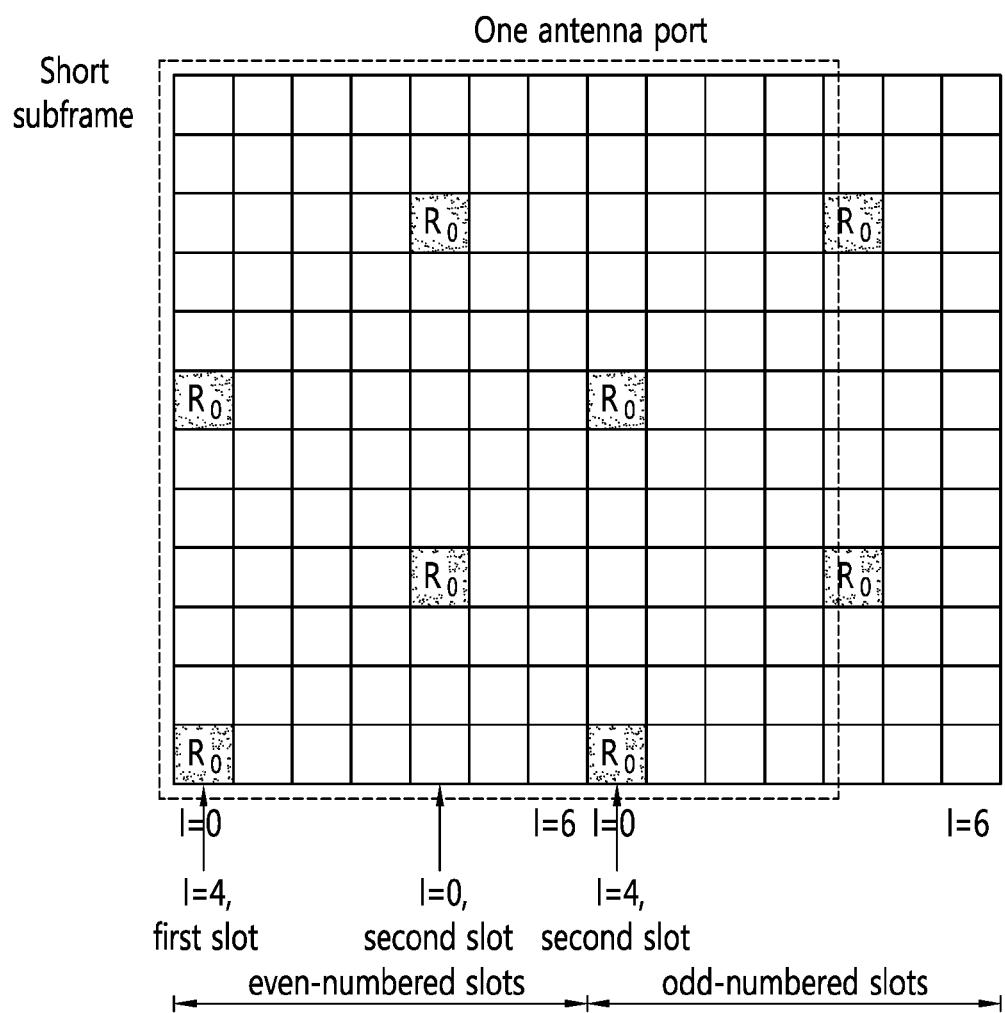

[Fig. 23]
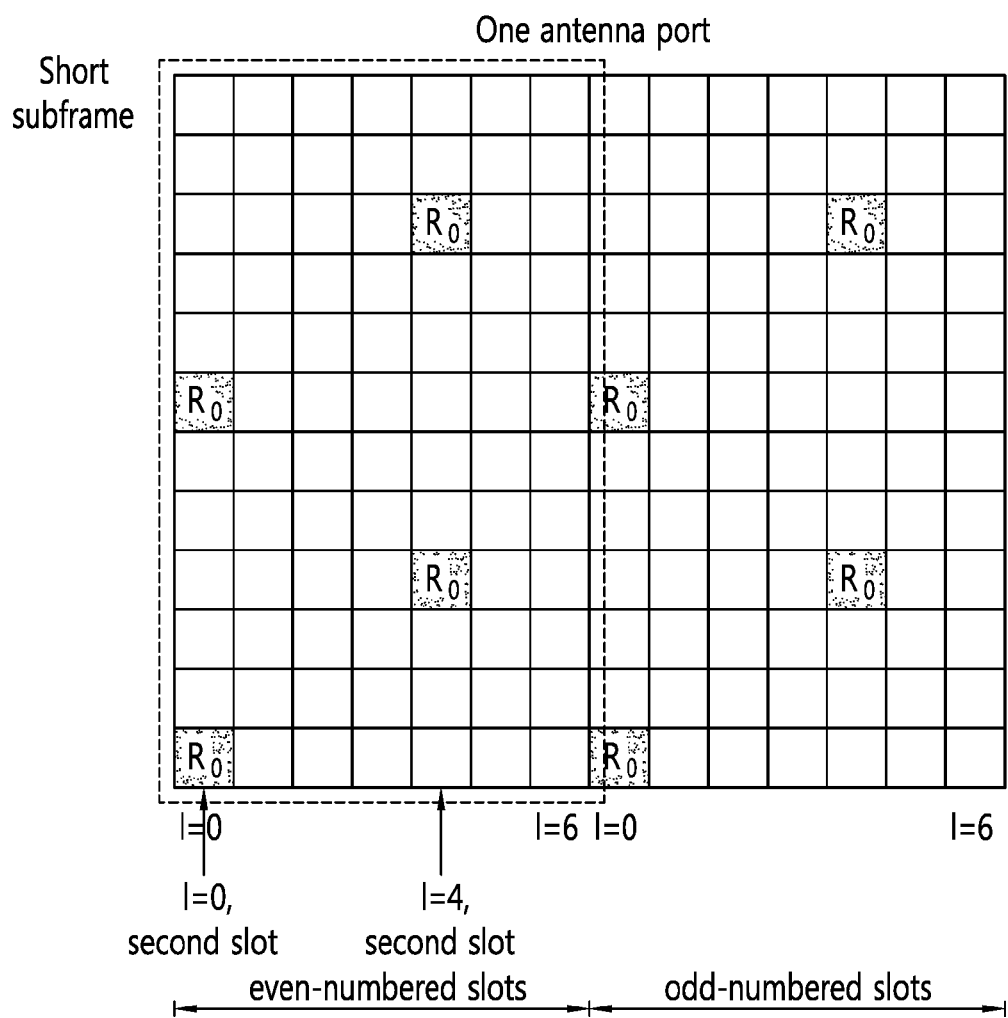

[Fig. 24]
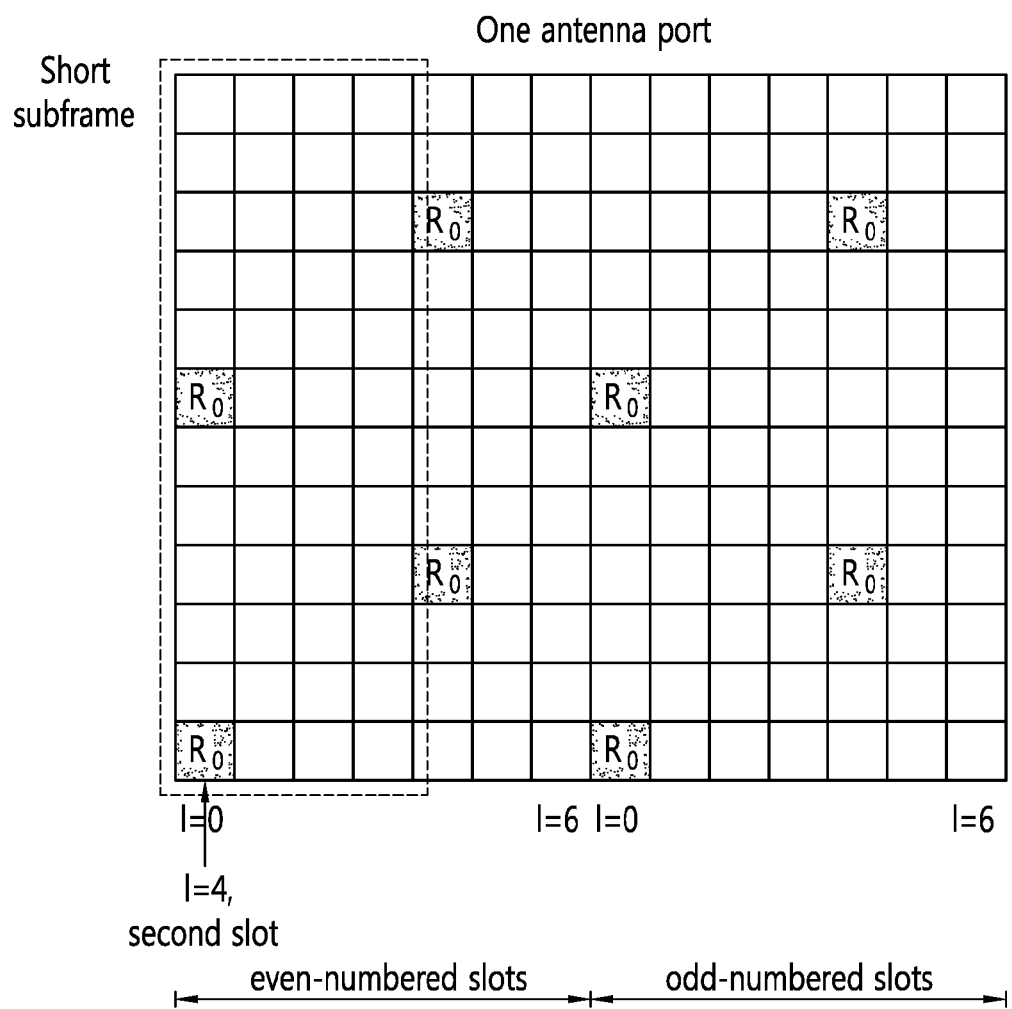

[Fig. 25]
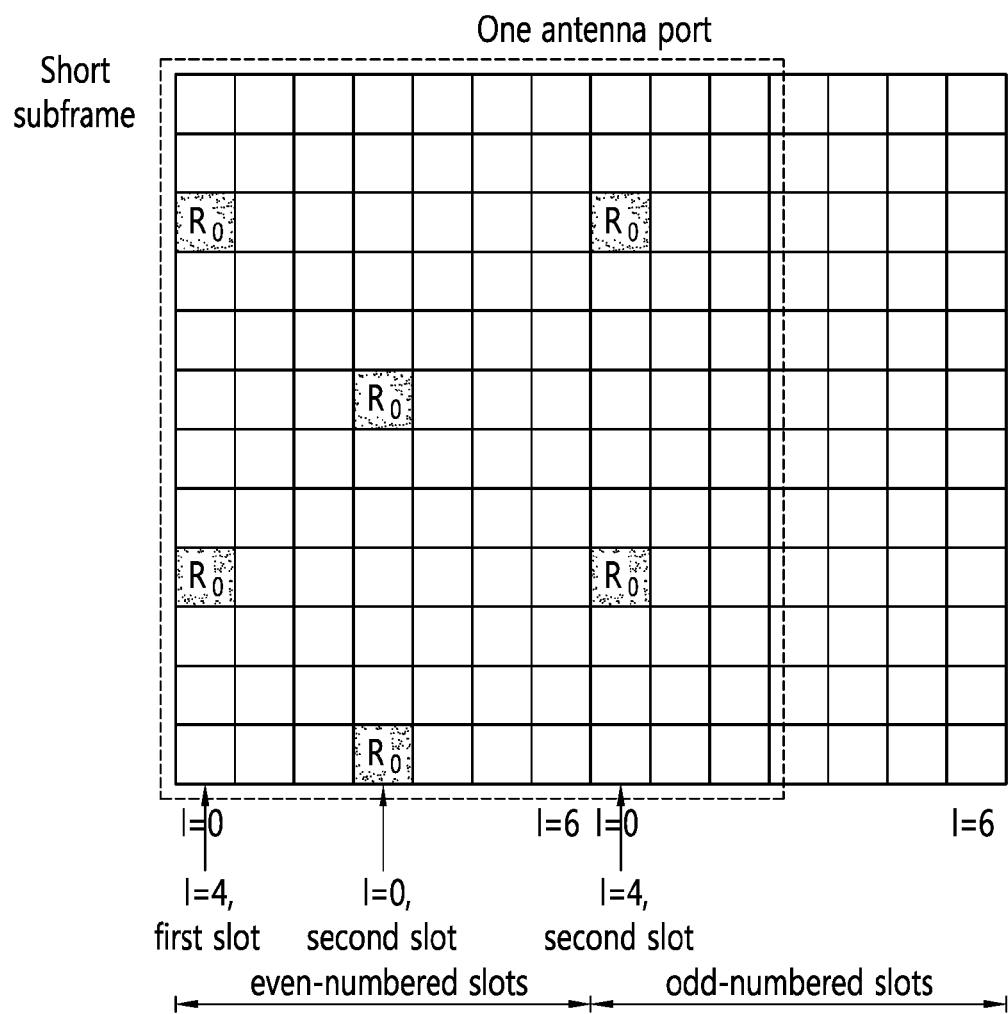

[Fig. 26]
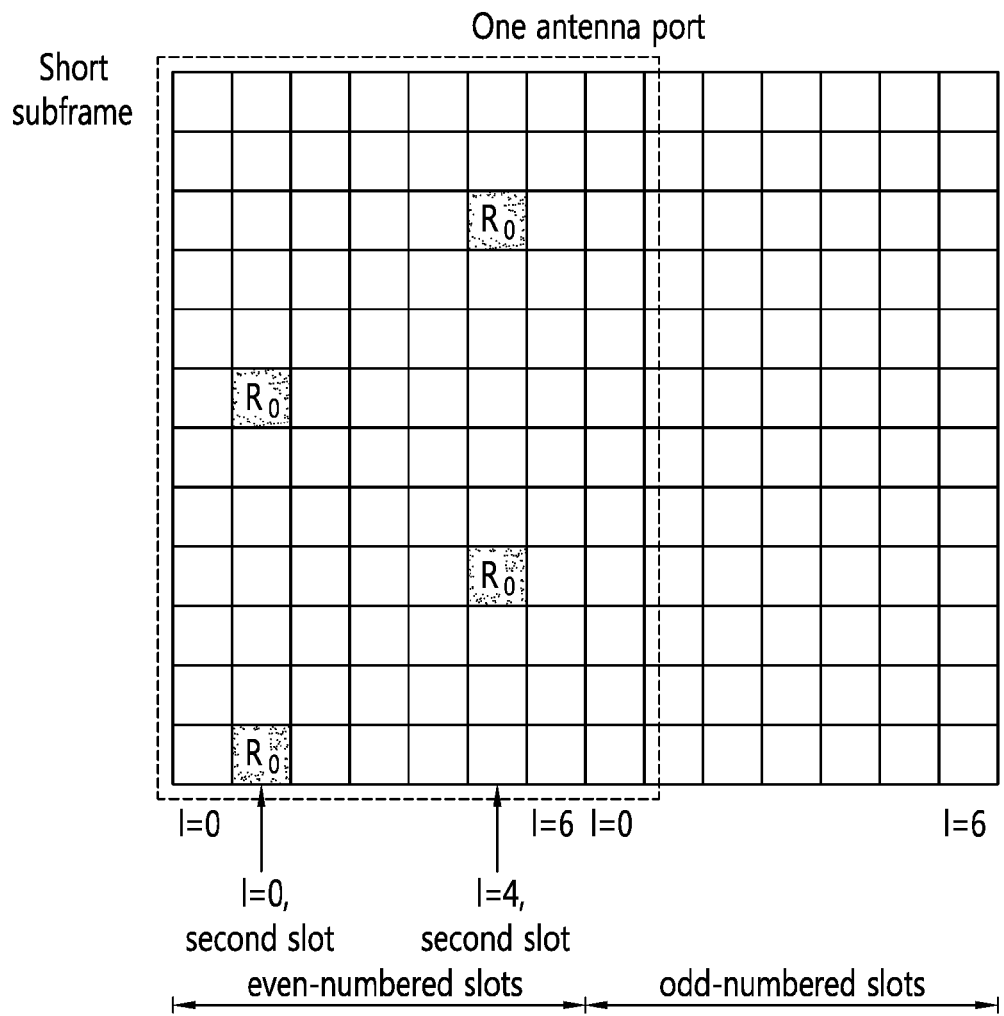

[Fig. 27]
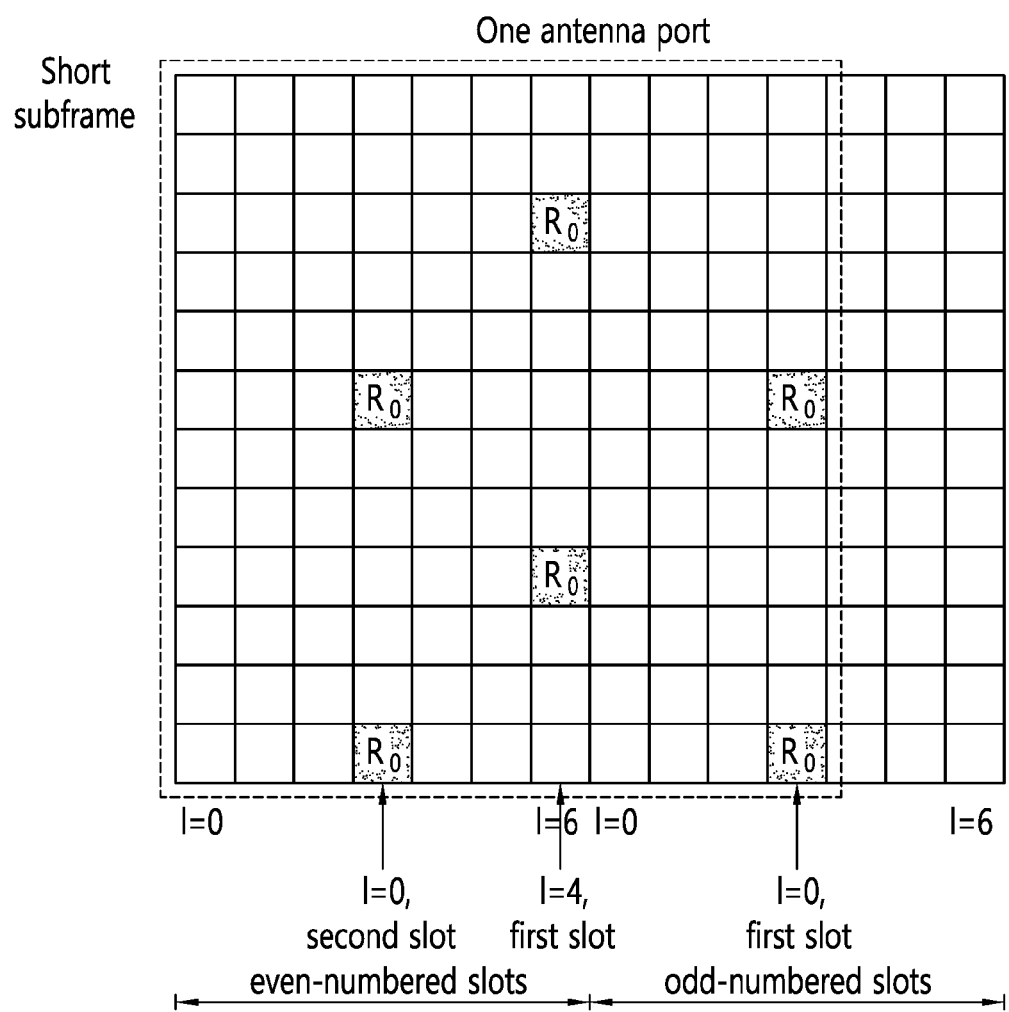

[Fig. 28]
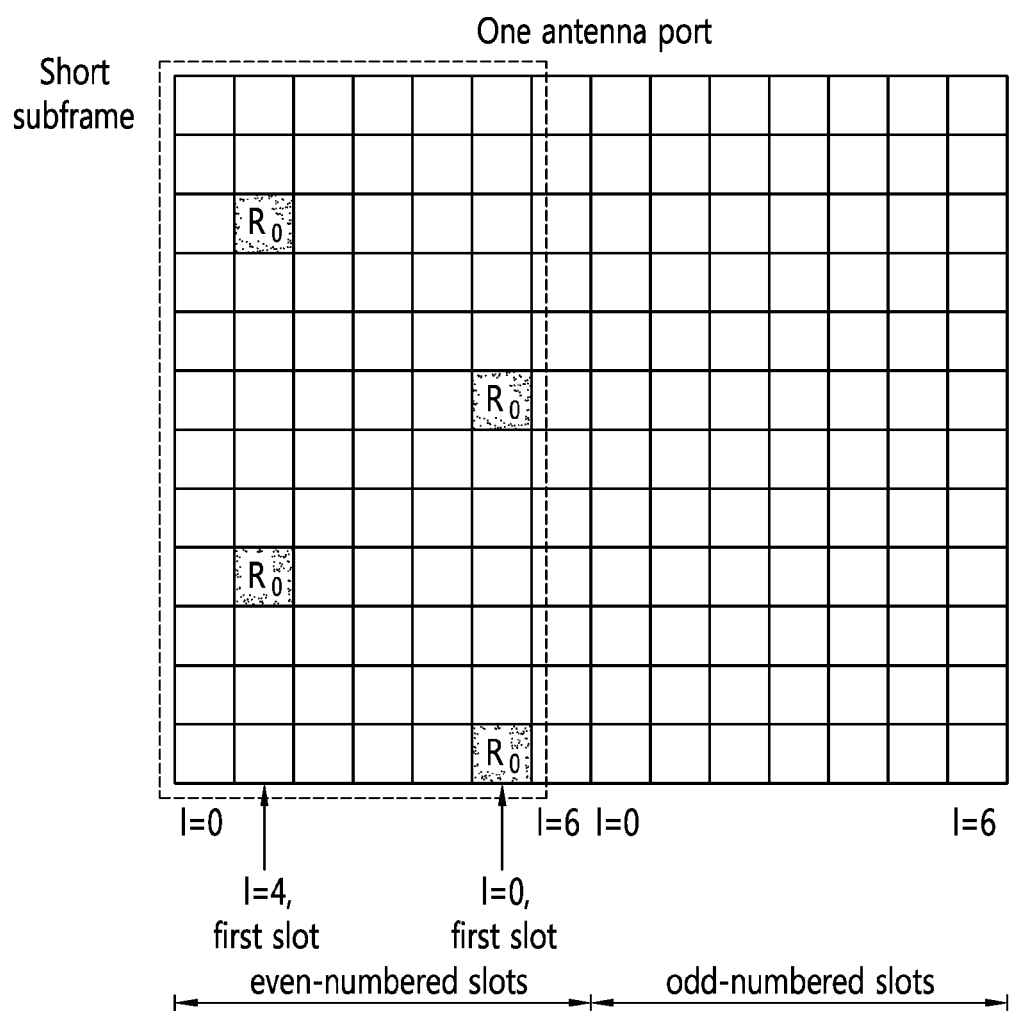

[Fig. 29]
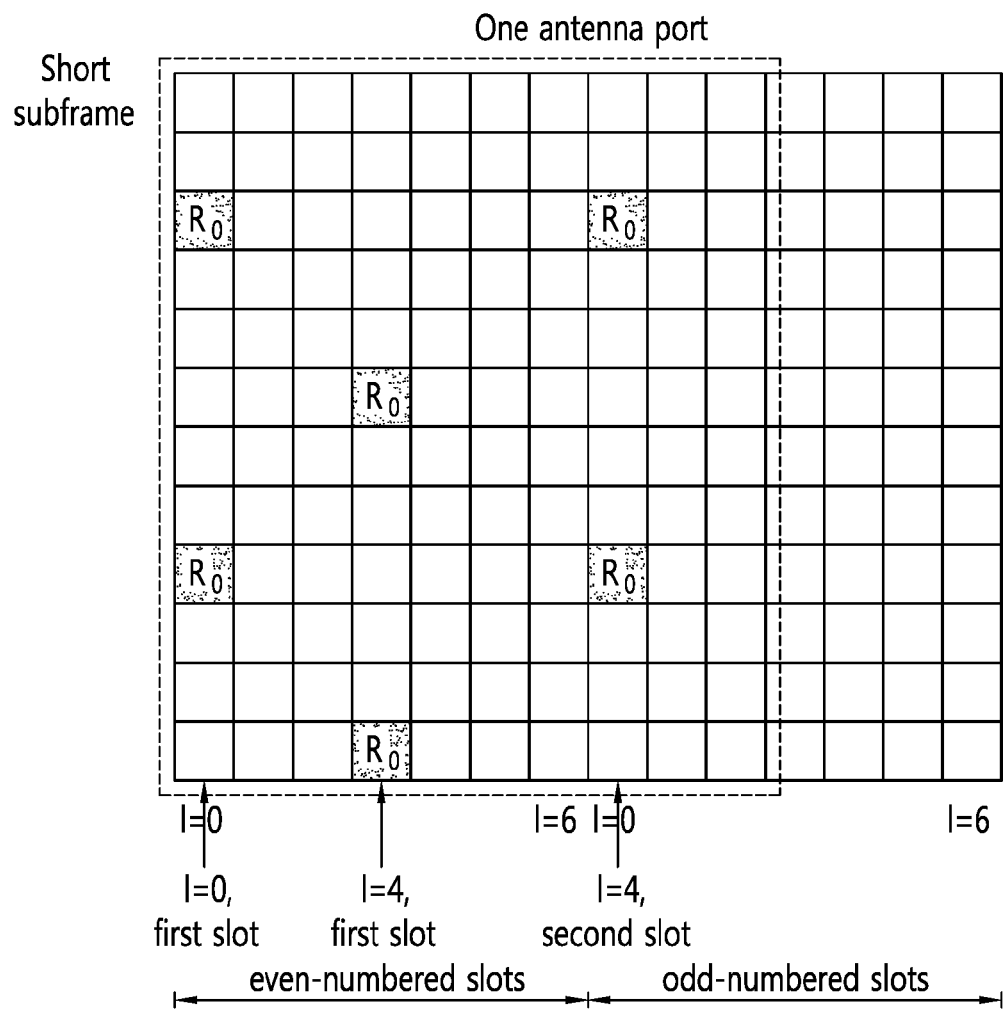

[Fig. 30]
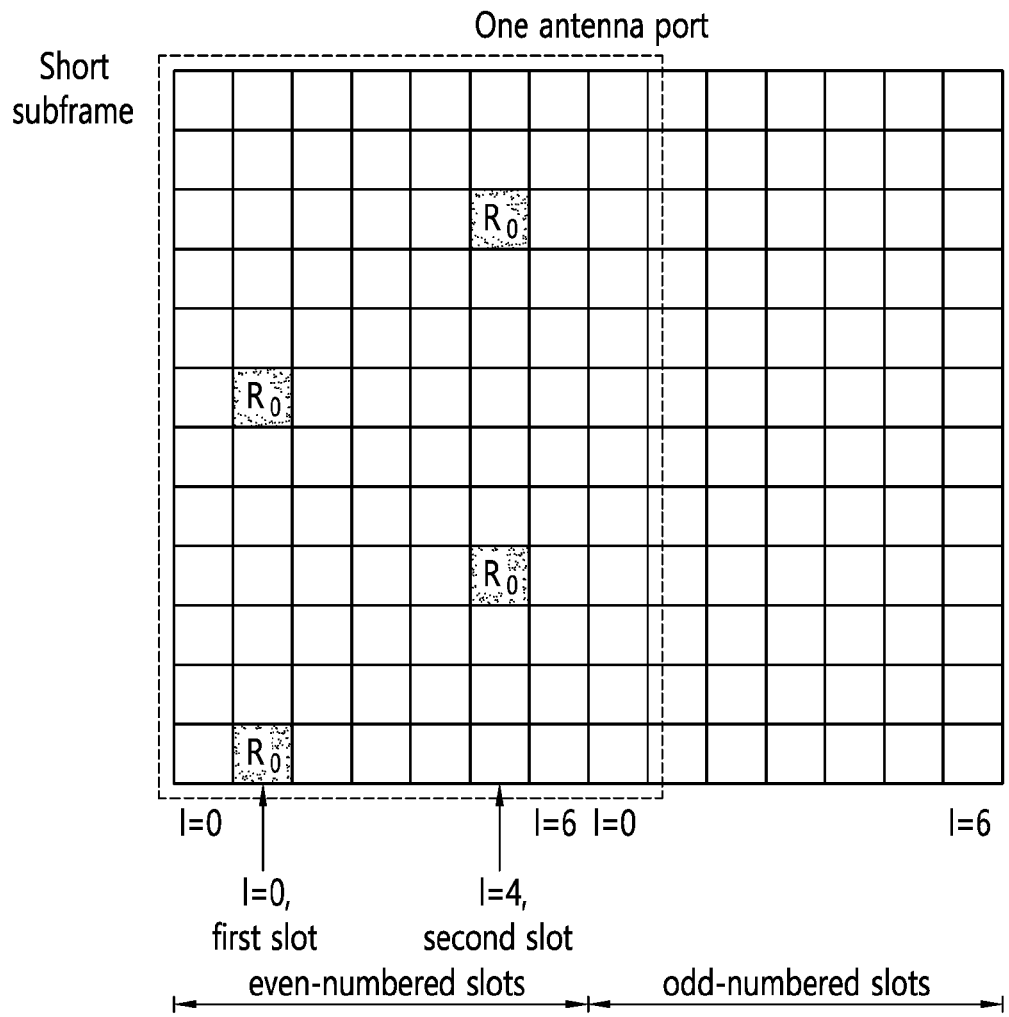
[Fig. 31]
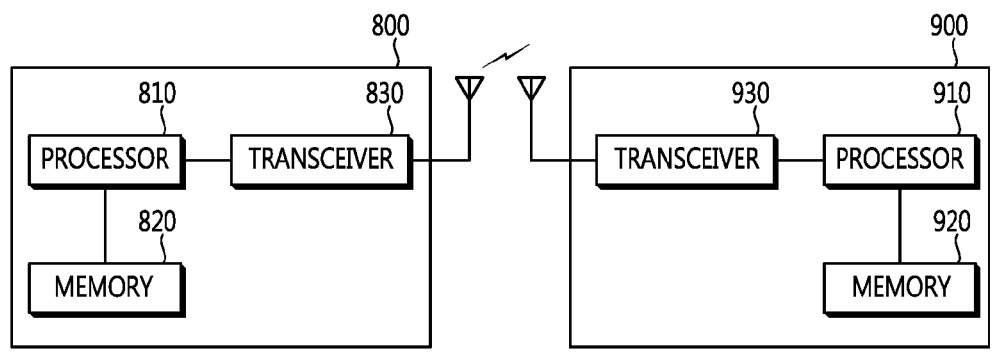

US 10,383,113 B2

METHOD AND APPARATUS FOR PERFORMING BLIND DETECTION IN WIRELESS COMMUNICATION SYSTEM

CROSS REFERENCE TO RELATED APPLICATIONS

This application is the National Phase of PCT International Application No. PCT/KR2015/005961, filed on Jun. 12, 2015, which claims priority under 35 U.S.C. 119(e) to U.S. Provisional Application No. 62/011,091 filed on Jun. 12, 2014, U.S. Provisional Application No. 62/023,189 filed on Jul. 11, 2014, U.S. Provisional Application No. 62/093,416 filed on Dec. 18, 2014 and U.S. Provisional Application No. 62/161,205 filed on May 13, 2015, all of which are hereby expressly incorporated by reference into the present application.

TECHNICAL FIELD

The present invention relates to wireless communications, and more particularly, to a method and apparatus for performing blind detection in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As the demands on data rate keeps increasing, the utilization/exploration on new spectrum and/or higher data rate is essential. As one of a promising candidate, utilizing unlicensed spectrum, such as 5 GHz unlicensed national information infrastructure (U-NII) radio band, is being considered. A method for operating in unlicensed spectrum efficiently may be required.

DISCLOSURE OF INVENTION

Technical Problem

The present invention provides a method and apparatus for performing blind detection in a wireless communication system. The present invention provides a method and apparatus for determining a length of a partial subframe in an unlicensed carrier based on detection of a starting orthogonal frequency division multiplexing (OFDM) symbol or an ending OFDM symbol.

Solution to Problem

In an aspect, a method for determining, by a user equipment (UE), a length of a physical downlink shared channel (PDSCH) in a wireless communication system is provided. The method includes detecting at least one of starting orthogonal frequency division multiplexing (OFDM) symbol or ending OFDM symbol of a PDSCH in an unlicensed carrier, and determining the length of the PDSCH in the unlicensed carrier based on the at least one of the starting OFDM symbol or the ending OFDM symbol of the PDSCH in the unlicensed carrier.

In another aspect, a user equipment (UE) includes a memory, a transceiver, and a processor coupled to the memory and the transceiver, and configured to detect at least one of starting orthogonal frequency division multiplexing (OFDM) symbol or ending OFDM symbol of a physical downlink shared channel (PDSCH) in an unlicensed carrier, and determine the length of the PDSCH in the unlicensed carrier based on the at least one of the starting OFDM symbol or the ending OFDM symbol of the PDSCH in the unlicensed carrier.

Advantageous Effects of Invention

Appropriate transport block size (TBS) can be determined, and correct data decoding can be enabled.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of a method for determining a length of a PDSCH in an unlicensed carrier according to an embodiment of the present invention.
FIG. 7 shows an example of a current CRS pattern.
FIG. 8 shows an example of a current UE-specific RS pattern.
FIG. 9 shows another example of a current UE-specific RS pattern.
FIG. 10 shows another example of a current UE-specific RS pattern.
FIG. 11 shows an example of a CRS pattern for a partial subframe according to an embodiment of the present invention.
FIG. 12 shows another example of a CRS pattern for a partial subframe according to an embodiment of the present invention.
FIG. 13 shows another example of a CRS pattern for a partial subframe according to an embodiment of the present invention.
FIG. 14 shows an example of a mirrored UE-specific RS pattern for a partial subframe according to an embodiment of the present invention.
FIG. 15 shows another example of a mirrored UE-specific RS pattern for a partial subframe according to an embodiment of the present invention.
FIG. 16 shows another example of a mirrored UE-specific RS pattern for a partial subframe according to an embodiment of the present invention.
FIG. 17 shows another example of a mirrored UE-specific RS pattern for a partial subframe according to an embodiment of the present invention.
FIG. 18 shows another example of a mirrored UE-specific RS pattern for a partial subframe according to an embodiment of the present invention.
FIG. 19 shows an example of a mirrored CRS pattern for a partial subframe according to an embodiment of the present invention.
FIG. 20 shows another example of a CRS pattern for a partial subframe according to an embodiment of the present invention.

FIG. 21 shows another example of a CRS pattern for a partial subframe according to an embodiment of the present invention.

FIG. 22 shows another example of a CRS pattern for a partial subframe according to an embodiment of the present invention.

FIG. 23 shows another example of a CRS pattern for a partial subframe according to an embodiment of the present invention.

FIG. 24 shows another example of a CRS pattern for a partial subframe according to an embodiment of the present invention.

FIG. 25 shows another example of a CRS pattern for a partial subframe according to an embodiment of the present invention.

FIG. 26 shows another example of a CRS pattern for a partial subframe according to an embodiment of the present invention.

FIG. 27 shows another example of a CRS pattern for a partial subframe according to an embodiment of the present invention.

FIG. 28 shows another example of a CRS pattern for a partial subframe according to an embodiment of the present invention.

FIG. 29 shows another example of a CRS pattern for a partial subframe according to an embodiment of the present invention.

FIG. 30 shows another example of a CRS pattern for a partial subframe according to an embodiment of the present invention.

FIG. 31 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number NAL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Carrier aggregation (CA) is described. It may be referred to Section 5.5 and 7.5 of 3GPP TS 36.300 V12.1.0 (2014-03). A UE with single timing advance (TA) capability for CA can simultaneously receive and/or transmit on multiple CCs corresponding to multiple serving cells sharing the same TA (multiple serving cells grouped in one timing advance group (TAG)). A UE with multiple TA capability for CA can simultaneously receive and/or transmit on multiple CCs corresponding to multiple serving cells with different TAs (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG). The CA is supported for both contiguous and noncontiguous CCs with each CC limited to a maximum of 110 resource blocks in the frequency domain.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. It is not possible to configure a UE with more UL CCs than DL CCs. In typical time division duplex (TDD) deployments, the number of CCs and the bandwidth of each CC in UL and DL is the same. The number of TAGs that can be configured depends on the TAG capability of the UE. CCs originating from the same eNB need not to provide the same coverage.

When CA is configured, the UE only has one RRC connection with the network. At RRC connection establishment/re-establishment/handover, one serving cell provides the NAS mobility information (e.g. tracking area identity (TAI)), and at RRC connection re-establishment/handover, one serving cell provides the security input. This cell is referred to as the primary cell (PCell). In the DL, the carrier corresponding to the PCell is the DL primary CC (DL PCC), while in the UL, it is the UL primary CC (UL PCC).

Depending on UE capabilities, secondary cells (SCells) can be configured to form, together with the PCell, a set of serving cells. In the DL, the carrier corresponding to a SCell is a DL secondary CC (DL SCC), while in the UL, it is an UL secondary CC (UL SCC).

Therefore, the configured set of serving cells for a UE always consists of one PCell and one or more SCells. For each SCell, the usage of UL resources by the UE in addition to the DL resources is configurable (the number of DL SCCs configured is therefore always larger than or equal to the number of UL SCCs and no SCell can be configured for usage of UL resources only). From a UE viewpoint, each UL resource only belongs to one serving cell. The number of serving cells that can be configured depends on the aggregation capability of the UE. PCell can only be changed with handover procedure (i.e. with security key change and RACH procedure). PCell is used for transmission of PUCCH. Unlike SCells, PCell cannot be de-activated. Re-establishment is triggered when PCell experiences radio link failure (RLF), not when SCells experience RLF. NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signaling is used for sending all required system information of the SCell, i.e. while in connected mode, UEs need not acquire broadcasted system information directly from the SCells.

In unlicensed spectrum where LTE devices may coexist with other radio access technology (RAT) devices such as Wi-Fi, Bluetooth, etc., it is necessary to allow a UE behavior adapting various scenarios. In LTE in unlicensed spectrum (LTE-U), various aspects for 3GPP LTE described above may not be applied for LTE-U. For example, the TTI described above may not be used for LTE-U carrier where variable or floating TTI may be used depending on the schedule and/or carrier sensing results. For another example, in LTE-U carrier, rather than utilizing a fixed DL/UL configuration, dynamic DL/UL configuration based on scheduling may be used. However, due to UE characteristics, either DL or UL transmission may occur at time. For another example, different number of subcarriers may also be utilized for LTE-U carrier.

As LTE frame structure is based on rather synchronized and deterministic way, if the channel acquisition time is not aligned with the LTE frame structure, the utilization of acquired channel may not be fully achieved. This means that, from a UE perspective, it may not know when exactly data is going to be transmitted.

When the network or UE acquires the channel, to reserve the channel, it is necessary to transmit reservation signals. To support efficient UE behavior, it is desirable to align subframe boundaries between licensed carrier and unlicensed carrier, if they are aggregated via CA. Though the UE may expect about timing difference up to 33 us due to propagation delay and potentially synchronization error between carriers in CA, in general, subframe-boundary aligned carriers may relieve some of UE requirements. Since channel acquisition may occur any time, not necessarily aligned with the subframe boundary, it is natural to consider partial data transmission once the channel is acquired. When partial data transmission is achieved, the UE needs to know the length of partial data transmission to determine appropriate transport block size (TBS) and to achieve correct data decoding.

Hereinafter, a method for determining a length of partial data transmission in unlicensed carrier, particularly based on UE blind detection, according to an embodiment of the present invention is described. A subframe in which partial data transmission occurs may be referred to as "partial subframe" (or, short subframe). According to an embodiment of the present invention, in order to determine the length of the partial subframe (or, the length of the PDSCH (data channel) in the partial subframe), blind detection of a starting/ending OFDM symbol of the PDSCH may be performed. In below, various methods for blind detection of a starting/ending OFDM symbol of the PDSCH are described.

First, blind detection of starting OFDM symbol of the PDSCH may be achieved by one or combination of the following approaches.

1) Detection based on PCFICH or similar channel: The starting OFDM symbol of the PDSCH may be determined upon detecting PCFICH or special channel/signal which indicates implicitly or explicitly the starting OFDM symbol of the PDSCH. If PCFICH is used for determining the starting OFDM symbol of the PDSCH, the UE may assume that the number of OFDM symbol indicated in the PCFICH is used for control channel and thus after that data may be scheduled. One example of the special channel may be a preamble. One example of the special signal may be a DCI which is cell-common and can be scheduled via PDCCH or EPDCCH. If this type of the special signal is used, the detection based on PDCCH or EPDCCH to be described below may be used.

2) Detection based on PDCCH: The starting OFDM symbol of the PDSCH may be determined upon detecting the PDCCH. Assuming that self-carrier scheduling is used, the UE may safely assume that data will be transmitted once it detects the scheduling DCI. This is also based on the assumption that PDCCH is always transmitted before data scheduling. Thus, in general, this may be applied to a technique where a UE blindly search a channel/signal which is transmitted in the beginning of a subframe (or a slot which is used a unit to deliver one data i.e., TTI) to determine the length of partial subframe/slot. This may be similar to PSS/SSS search where a UE searches a known preamble to determine the time location. Difference may be to perform this operation per OFDM symbol unit to minimize UE complexity. One example of such a signal is continuous CRS transmission in the first OFDM symbol of the partial subframe as a special signal mentioned in the first approach.

The number of OFDM symbol(s) used for the PDCCH may be configured by higher layer. Depending on the number of OFDM symbol(s) used for the PDCCH, the following issues may occur. If it is assumed that the number of symbol(s) used for the PDCCH is 1, ambiguity may not exist. On the other hand, if it is assumed that the number of symbol(s) used for the PDCCH is more than 1 and the PDCCH may start in any OFDM symbol, ambiguity may exist in terms of the starting OFDM symbol of the PDSCH. To address this ambiguity issue, the starting symbol of the PDCCH may be fixed to only a few OFDM symbols in the subframe (e.g., OFDM symbol #0, #4, #5, #9). Or, different scrambling or CRC may be used to indicate the location of first CCE in terms of OFDM symbol in between [0~M−1]. It may be represented between 0~13 to cover all OFDM symbols. However, if M is fixed, different scrambling or CRC to differentiate between [0~M−1] may be sufficient. Or, in scrambling of the PDCCH, the starting OFDM symbol (and ending OFDM symbol if it is not known by other configuration) may be used for scrambling. This may be used in conjunction with slot index or subframe index or used alone.

3) Detection based on RS: The starting OFDM symbol of the PDSCH may be determined based on RS pattern, scrambling, etc. Once it is determined, the UE may apply the number of OFDM symbols used for the control channel to compute the starting OFDM symbol of the PDSCH or apply the starting OFDM symbol of the PDSCH. More detailed schemes may be shown in below for this approach.

4) Detection based on EPDCCH: The starting OFDM symbol of the PDSCH may be determined upon detecting the EPDCCH, instead of the PDCCH. In terms of placing EPDCCH in the partial subframe, the following approaches may be considered.

Alt 1: If starting OFDM symbols of the EPDCCH are restricted such that the length of the EPDCCH resource region can be mapped to one of downlink pilot time slot (DwPTS) length, EPDCCH may be mapped with various DwPTS lengths. In this case, the mapping may start in the middle (i.e., mapping of OFDM symbol 0 maps to mapping in starting OFDM symbol) or the mapping may start in the last by mirroring similar to UE-specific RS approach. Since this may increase the blind detection candidates, a set of restricted blind detection candidates may be configured to the UE which may be used for the partial subframe. The UE may assume that a full subframe is used after the partial subframe (if data burst duration is known, the UE may assume that a set of full subframes may be used during data burst). For example, if the starting OFDM symbol locations corresponds to 4 sets, total blind detection candidates may be divided to those 4 sets equally or with some weights or per predefined candidates. Resource mapping and aggregation level selection may follow DwPTS configuration.

Alt 2: Starting OFDM symbol of the EPDCCH may be any OFDM symbol. In this case, the number of candidates may increase significantly. Thus, restriction of blind detection per each OFDM symbol may be further considered. In this case, utilizing special subframe may be difficult. Thus, mapping based on full subframe may be used where the first few OFDM symbols not used for the EPDCCH may be rate matched or punctured.

Alt 3: Regardless of restricted length of EPDCCH resource region, full subframe based EPDCCH mapping is used as in Alt 2.

In detection based on EPDCCH, similar to ambiguity issue in detection based on PDCCH described above, depending on enhanced CCE (ECCE) mapping, ambiguity may exist when a DCI is detected. To address this ambiguity issue, DCI may carry the length of the PDSCH. Once the DCI is detected, the UE may know the length of the PDSCH. Or, different scrambling or CRC may be used to indicate the location of first CCE in terms of OFDM symbol in between [0~M−1] where M is the length of the EPDCCH resource (or PDSCH length in number of OFDM symbols). Or, in scrambling of the EPDCCH, the starting OFDM symbol (and ending OFDM symbol if it is not known by other configuration) may be used for scrambling. This may be used in conjunction with slot index or subframe index or used alone.

One hybrid option is that the starting OFDM symbol of the partial subframe may be determined based on preamble, whereas the PDCCH or EPDCCH (with or without RS) may be used for the full subframe. In other words, the UE may perform blind decoding on the PDCCH or EPDCCH (if the subframe is not known as off-subframe) assuming that the subframe is the full subframe. If the UE fails to detect the full subframe, thereafter the UE may attempt to detect the partial subframe (if it does not know whether the subframe is a full subframe) using preamble or special signal. To minimize preamble detection to UEs without downlink scheduling, this hybrid option may be also used with RS-based blind detection. In other words, if RS is detected based on the assumption of the full subframe, the UE may assume the full subframe. Otherwise, the UE may attempt to detect the partial subframe based on preamble or other special signal.

As mentioned above, a special DCI may be transmitted to cover the case where the UE, which is not scheduled with data transmission, wants to detect whether the network has transmitted any signal or not in a subframe. If transmitted, the length of the PDSCH may need to be known as well. The special DCI may be present only in a subset of subframes configured by the network (e.g., in DRS subframes, in subframe #0, #5). If the UE is able to blindly detect the special DCI, the UE may estimate the length of the PDSCH and also know that the subframe is on-state for e.g. measurement, tracking purposes.

If higher layer signaling indicates the starting OFDM symbol for the PDSCH, the special channel may be used to determine the starting OFDM symbol for any transmission where the starting OFDM symbol for the PDSCH is determined "start_OFDM_symbol"+higher layer configured OFDM symbol gap for data. In other words, the special channel or PDCCH may indicate the starting OFDM symbol of the control channel or other transmission and the starting OFDM symbol of the PDSCH may be determined in combination of starting OFDM symbol from blind detection and gap configured by higher layer. When the EPDCCH is used, the UE may assume that the starting OFDM symbol of the EPDCCH and PDSCH is the same.

Second, blind detection of ending OFDM symbol of the PDSCH may be achieved by one or combination of the following approaches.

1) Detection based on PCFICH or similar channel: The ending OFDM symbol of the PDSCH may be determined upon detecting PCFICH or special channel/signal which indicates implicitly or explicitly the ending OFDM symbol of the PDSCH. If PCFICH is used for determining the ending OFDM symbol of the PDSCH, the UE may assume that the number of OFDM symbol indicated in the PCFICH is used for transmission and thus ending OFDM symbols may be explicitly indicated. To avoid confusion of reading PCFICH in case of the partial subframe where the starting OFDM symbol index is not zero, full subframe, partial subframe where the ending OFDM symbol may be smaller than the maximum number of OFDM symbols in a subframe, different special channel to indicate starting or ending OFDM symbol may be considered. One example of the special channel is a post-signal. One example of the special signal may be a DCI which is cell-common and can be scheduled via PDCCH or EPDCCH. If this type of the special signal is used, the detection based on PDCCH or EPDCCH to be described below may be used.

2) Detection based on PDCCH: The ending OFDM symbol of the PDSCH may be determined upon detecting the PDCCH. Assuming that self-carrier scheduling is used, the UE may safely assume that data will be transmitted once it detects the scheduling DCI. To indicate the ending OFDM symbol, the PDCCH may be placed in the ending OFDM symbol (in other words, PDSCH and PDCCH mapping may be reversed). This may be implemented by mirroring the data mapping in the partial subframe ending earlier than the full subframe. Or, DCI may indicate the length of the PDSCH.

The number of OFDM symbol(s) used for the PDCCH may be configured by higher layer. Depending on the number of OFDM symbol(s) used for the PDCCH, the following issues may occur. If it is assumed that the number of symbol(s) used for the PDCCH is 1, ambiguity may not exist. On the other hand, if it is assumed that the number of symbol(s) used for the PDCCH is more than 1 and the PDCCH may start in any OFDM symbol, ambiguity may exist in terms of the ending OFDM symbol of the PDSCH. To address this ambiguity issue, the ending symbol of the PDCCH may be fixed to only a few OFDM symbols in the subframe (e.g., OFDM symbol #4, #5, #9, #13). Or, DCI may carry the gap between DCI and PDSCH starting position. For example, gap may be 0 to M-1 where M is the number of OFDM symbols used for the PDCCH such that regardless of which OFDM symbol(s) is used for DCI transmission, PDSCH may be transmitted in the defined location. The gap may be applied between OFDM symbol where first CCE is transmitted and ending OFDM symbol of the PDSCH. The ending OFDM symbol of the PDSCH may be determined by OFDM symbol of first CCE-gap-1. Or, different scrambling or CRC may be used to indicate the location of first CCE in terms of OFDM symbol in between [0~M-1]. It may be represented between 0~13 to cover all OFDM symbols. However, if M is fixed, different scrambling or CRC to differentiate between [0~M-1] may be sufficient. Or, in scrambling of the PDCCH, the ending OFDM symbol may be used for scrambling. This may be used in conjunction with slot index or subframe index or used alone.

3) Detection based on RS: The ending OFDM symbol of the PDSCH may be determined based on RS pattern, scrambling, etc. Once it is determined, the UE may apply the number of OFDM symbols used for the control channel to compute the ending OFDM symbol of the PDSCH or apply the ending OFDM symbol of the PDSCH. More detailed schemes may be shown in below for this approach.

4) Detection based on EPDCCH: The ending OFDM symbol of the PDSCH may be determined upon detecting the EPDCCH, instead of the PDCCH. In terms of placing EPDCCH in the partial subframe, the following approaches may be considered.

Alt 1: If ending OFDM symbols of the EPDCCH are restricted such that the length of the EPDCCH resource region can be mapped to one of DwPTS length, EPDCCH may be mapped with various DwPTS lengths. Since this may increase the blind detection candidates, a set of restricted blind detection candidates may be configured to the UE which may be used for the partial subframe. Resource mapping and aggregation level selection may follow DwPTS configuration.

Alt 2: The ending OFDM symbol of the EPDCCH may be any OFDM symbol. In this case, the number of candidates may increase significantly. Thus, restriction of blind detection per each OFDM symbol may be further considered. In this case, utilizing special subframe may be difficult. Thus, mapping based on full subframe may be used where the first few OFDM symbols not used for the EPDCCH may be rate matched or punctured.

Alt 3: Regardless of restricted length of EPDCCH resource region, full subframe based EPDCCH mapping is used as in Alt 2.

In detection based on EPDCCH, similar to ambiguity issue in detection based on PDCCH described above, depending on ECCE mapping, ambiguity may exist when a DCI is detected. To address this ambiguity issue, DCI may carry the length of the PDSCH. Once the DCI is detected, the UE may know the length of the PDSCH. Or, different scrambling or CRC may be used to indicate the location of first CCE in terms of OFDM symbol in between [0~M-1] where M is the length of the EPDCCH resource (or PDSCH length in number of OFDM symbols). Or, in scrambling of the EPDCCH, the ending OFDM symbol may be used for scrambling. This may be used in conjunction with slot index or subframe index or used alone.

One hybrid option is that the ending OFDM symbol of the partial subframe may be determined based on preamble, whereas the PDCCH or EPDCCH (with or without RS) may be used for the full subframe. In other words, the UE may perform blind decoding on the PDCCH or EPDCCH (if the subframe is not known as off-subframe) assuming that the subframe is the full subframe. Even though the UE has detected the PDCCH, it does not mean that the subframe is a full subframe. In such a case, a post-signal may be used to indicate the ending OFDM symbol of the PDSCH. Or, EPDCCH detection based on the full subframe fails, the UE may attempt to detect the partial subframe (if it does not know whether the subframe is a full subframe) post-signal or special signal. To minimize post-signal detection to UEs without downlink scheduling, this hybrid option may be also used with RS-based blind detection. In other words, if RS is detected based on the assumption of the full subframe, the UE may assume the full subframe. Otherwise, the UE may attempt to detect the partial subframe based on post-signal or other special signal.

As mentioned above, a special DCI may be transmitted to cover the case where the UE, which is not scheduled with data transmission, wants to detect whether the network has transmitted any signal or not in a subframe. If transmitted, the length of the PDSCH may need to be known as well. The special DCI may be present only in a subset of subframes configured by the network (e.g., in DRS subframes, in subframe #0, #5). If the UE is able to blindly detect the special DCI, the UE may estimate the length of the PDSCH and also know that the subframe is on-state for e.g. measurement, tracking purposes.

The embodiment of the present invention described above, i.e. a method for determining the starting/ending OFDM symbol of the PDSCH, may be also applied to determine the length of network transmission regardless of data or other signal(s). Further, the PDCCH described above may be applied in case that EPDCCH or other control channel is used in unlicensed carrier. Furthermore, different type of control channel may be used in different set of subframes or time instances. For example, even though the UE is configured with EPDCCH in unlicensed carrier, in the partial subframe, the UE may assume that the PDCCH is used. In other words, blind detection on control channel is assumed to be with the PDCCH whereas the EPDCCH is used when the full subframe may be assumed. Thus, the PDCCH described above may simply refer a control channel format used in unlicensed carrier.

FIG. 6 shows an example of a method for determining a length of a PDSCH in an unlicensed carrier according to an embodiment of the present invention. In step S100, the UE detects at least one of starting OFDM symbol or ending OFDM symbol of a PDSCH in an unlicensed carrier. In step S110, the UE determines the length of the PDSCH in the unlicensed carrier based on the at least one of the starting OFDM symbol or the ending OFDM symbol of the PDSCH in the unlicensed carrier.

The at least one of the starting OFDM symbol or the ending OFDM symbol may be detected base on blind detection of a PDCCH. The at least one of the starting OFDM symbol or the ending OFDM symbol may be detected based on DCI received via the PDCCH. A starting OFDM symbol of the PDCCH may be fixed. Different scrambling or CRC may be used for the PDCCH. The at least one of the starting OFDM symbol or the ending OFDM symbol may be used for scrambling of the PDCCH. Alternatively, the at least one of the starting OFDM symbol or the ending OFDM symbol may be detected based on a RS pattern. The RS pattern may be a CRS pattern or a UE-specific RS pattern. The RS pattern may be a mirrored RS pattern of a CRS pattern or a UE-specific RS pattern. The length of the PDSCH may be determined as a length from the starting OFDM symbol of the PDSCH to the last OFDM symbol of a subframe. The length of the PDSCH may be determined as a length from the first OFDM symbol of a subframe to the ending OFDM symbol. Alternatively, the at least one of the starting OFDM symbol or the ending OFDM symbol may be detected base on blind detection of a PCFICH. Alternatively, the at least one of the starting OFDM symbol or the ending OFDM symbol may be detected base on blind detection of EPDCCH.

Hereinafter, various RS patterns for the partial subframe in unlicensed carrier according to an embodiment of the present invention are described. As described above, the UE may detect the length of the PDSCH by detecting RS pattern.

Cell-specific RS (CRS) may be referred to Section 6.10.1 of 3GPP TS 36.211 V12.0.0 (2013-12). CRS shall be transmitted in all DL subframes in a cell supporting PDSCH transmission. CRS is transmitted on one or several of antenna ports 0 to 3. CRS is defined for $\Delta f=15$ kHz only.

UE-specific RS may be referred to Section 6.10.3 of 3GPP TS 36.211 V12.0.0 (2013-12). The UE-specific RS associated with PDSCH is transmitted on antenna port(s) p=5, p=7, p=8, or p=7, 8, . . . , v+6, where v is the number of layers used for transmission of the PDSCH. The UE-specific RS is present and is a valid reference for PDSCH demodulation only if the PDSCH transmission is associated with the corresponding antenna port. The UE-specific RS is transmitted only on the physical resource blocks upon which the corresponding PDSCH is mapped. The UE-specific reference signal associated with PDSCH is not transmitted in REs (k,l) in which one of the physical channels or physical signals other than the UE-specific RS are transmitted using REs with the same index pair (k,l) regardless of their antenna port p.

FIG. 7 shows an example of a current CRS pattern. FIG. 7 shows the REs used for CRS for antenna port 0.

FIG. 8 shows an example of a current UE-specific RS pattern. FIG. 8 shows the REs used for UE-specific RS for normal CP for antenna ports 7 when special subframe configuration is 1, 2, 6 or 7.

FIG. 9 shows another example of a current UE-specific RS pattern. FIG. 9 shows the REs used for UE-specific RS for normal CP for antenna ports 7 when special subframe configuration is 3, 4, 8 or 9.

FIG. 10 shows another example of a current UE-specific RS pattern. FIG. 10 shows the REs used for UE-specific RS for normal CP for antenna ports 7 for all other DL subframes.

First, RS patterns for blind detection of the partial subframe in unlicensed carrier, which starts at the middle of the subframe and ends at the last OFDM symbol of the subframe, are described. Based on RS patterns described below, the length of the partial subframe may be determined.

(1) Approach A-1: Keep the Current RS Pattern.

If the UE detects CRS, the UE may attempt to detect CRS in each OFDM symbol where CRS may be transmitted to detect the partial subframe. For example, the partial subframe may be achieved in normal CP by 14 OFDM symbols when the UE detects CRS in the first OFDM symbol in the first slot, or 10 OFDM symbols when the UE detects CRS in the fourth OFDM symbol in the first slot, or 7 OFDM symbols when the UE detects CRS in the first OFDM symbol in the second slot, or 3 OFDM symbols when the UE detects CRS in the fourth OFDM symbol in the second slot. For each case, it is assumed that when the UE fails to detect the previous case, the UE may detect the next case. Then, based on how many OFDM symbols are detected with CRS transmission, the UE may determine how many OFDM symbols are used for data transmission. Utilizing this approach, the number of OFDM symbols used for the partial subframe may be limited such as 3 OFDM symbols, 7 OFDM symbols, 10 OFDM symbols and 14 OFDM symbols in normal CP.

This may be done via detection of UE-specific RS as well. In this case, unless the position of UE-specific RS changes, full subframe transmission may be achieved when UE-specific RS in each slot is detected, or half subframe transmission may be achieve when UE-specific RS in the second slot only is detected. Similarly, this approach may be applied to allow partial subframe transmission where the channel acquisition ends in the middle of the subframe. For example, first slot transmission may be only achieved when UE-specific RS in the first slot is only detected.

If this approach is used, one issue is false detection of the starting OFDM symbol of the PDSCH where transmission may occur which may lead performance degradation and potentially corrupt HARQ-buffer. To mitigate this issue, one approach is to change the RS sequence per each OFDM symbol where the first RS can start with the sequence generated for the first OFDM symbol. For example, if the first OFDM symbol of the partial subframe is the fourth OFDM symbol in the first slot, instead of using l=4 to generate the CRS sequence, l=0 may be used to generate the CRS sequence while keeping the same RE position of fourth OFDM symbol in the first slot. Similarly, for the CRS sequence in the first OFDM symbol in the second slot, the CRS sequence may be generated by using l=4 in the first slot. For the CRS sequence in the fourth OFDM symbol in the second slot, the CRS sequence may be generated by using l=0 in the second slot. In other words, from the sequence generation perspective, it may be considered that nothing has been changed.

FIG. 11 shows an example of a CRS pattern for a partial subframe according to an embodiment of the present invention. FIG. 11 corresponds to a case that the partial subframe is achieved in normal CP by 10 OFDM symbols when the UE detects CRS in the fourth OFDM symbol in the first slot.

FIG. 12 shows another example of a CRS pattern for a partial subframe according to an embodiment of the present invention. FIG. 12 corresponds to a case that the partial subframe is achieved in normal CP by 7 OFDM symbols when the UE detects CRS in the first OFDM symbol in the second slot.

FIG. 13 shows another example of a CRS pattern for a partial subframe according to an embodiment of the present invention. FIG. 13 corresponds to a case that the partial subframe is achieved in normal CP by 3 OFDM symbols when the UE detects CRS in the fourth OFDM symbol in the second slot.

The drawing, which corresponds to a case that the partial subframe is achieved in normal CP by 14 OFDM symbols when the UE detects CRS in the first OFDM symbol in the first slot, is omitted, since the partial subframe is a full subframe.

By using this approach, the UE may determine the potential number of OFDM symbols used by the partial subframe and then based on the CRS sequence, the UE may verify the length of the partial subframe by applying the CRS sequence based on the detected length. Alternatively, the UE may blindly search the length of the partial subframe based on the CRS sequence as well.

(2) Approach A-2: Mirror RS-Pattern

Another approach to determine the length of the partial subframe is to blindly detect mirrored RS pattern based on UE-specific RS pattern or CRS pattern in the special subframe. That is, mirrored UE-specific RS pattern may indicate the length of the partial subframe. For example, as shown above in FIG. 8 to FIG. 10, currently three UE-specific RS patterns are specified for special subframe depending on the length of the subframe. Since DwPTS starts in the first OFDM symbol whereas the partial subframe can start in any OFDM symbol while it ends in the last OFDM symbol, direct applying UE-specific RS pattern of the special subframe to the partial subframe is not easily feasible. Accordingly, the UE-specific RS pattern may be changed by mirroring such that it starts from the last OFDM symbol rather than from the first OFDM symbol.

FIG. 14 shows an example of a mirrored UE-specific RS pattern for a partial subframe according to an embodiment of the present invention. FIG. 14 shows a mirrored UE-specific RS pattern of the current UE-specific RS pattern for special subframe configuration 1, 2, 6 or 7, shown in FIG. 8 above. The mirrored US-specific RS pattern shown in FIG. 14 may indicate the size of the partial subframe of 9 OFDM symbols. When the UE detects this UE-specific RS pattern starting from the last OFDM symbol, the UE may assume that 9 OFDM symbols are used for the partial subframe.

FIG. 15 shows another example of a mirrored UE-specific RS pattern for a partial subframe according to an embodiment of the present invention. FIG. 15 shows a mirrored UE-specific RS pattern of the current UE-specific RS pattern for special subframe configuration 3, 4, 8 or 9, shown in FIG. 9 above. The mirrored US-specific RS pattern shown in FIG. 15 may indicate the size of the partial subframe of 11 OFDM symbols.

FIG. 16 shows another example of a mirrored UE-specific RS pattern for a partial subframe according to an embodiment of the present invention. FIG. 16 shows a mirrored UE-specific RS pattern of the current UE-specific RS pattern for all other DL subframes, shown in FIG. 10 above. The mirrored US-specific RS pattern shown in FIG. 16 may indicate the size of the partial subframe of 14 OFDM symbols.

FIG. 17 shows another example of a mirrored UE-specific RS pattern for a partial subframe according to an embodiment of the present invention. FIG. 17 shows a case that only one pair of the mirrored UE-specific RS pattern shown in FIG. 16 is detected. In this case, the UE may assume that 7 OFDM symbols (one slot) are used for the partial subframe.

FIG. 18 shows another example of a mirrored UE-specific RS pattern for a partial subframe according to an embodiment of the present invention. FIG. 18 shows a case that only one pair of the mirrored UE-specific RS pattern shown in FIG. 14 or FIG. 15 is detected. In this case, the UE may assume that 5 OFDM symbols are used for the partial subframe. It is notable that shorter size such as 4 OFDM symbols may be assumed for the partial subframe.

FIG. 19 shows an example of a mirrored CRS pattern for a partial subframe according to an embodiment of the present invention. As similar as the mirrored UE-specific RS pattern, the mirrored CRS pattern may indicate the length of the partial subframe. FIG. 19 shows a mirrored CRS pattern of the current CRS pattern shown in FIG. 7 above. In this case, the UE may assume the length of the partial subframe as followings:

3 (or 4) OFDM symbols when the UE detects CRS in the last OFDM symbol
7 OFDM symbols when the UE detects CRSs in the second slot
10 (or 11) OFDM symbols when the UE detects CRS in the last OFDM symbol of the first slot and CRS in the second slot
14 OFDM symbols when the UE detects all CRS in both first and second slot.

(3) Approach A-3: Starting with Preamble or Known Sequence in the First OFDM Symbol of the Partial Subframe Another approach is to start the partial subframe with preamble or known sequence in the first OFDM symbol. By detecting the preamble or known sequence, the UE may determine the length of the partial subframe. One example is to transmit CRS which has the sequence of the first OFDM symbol of the first slot (i.e., l=0 and first slot). When the UE detects the known sequence at an OFDM symbol i, the UE may assume that i-th OFDM symbol is the starting OFDM symbol of the partial subframe. According to this approach, 1 to 14 OFDM symbols may be used for the partial subframe. If CRS is transmitted in the partial subframe, starting from the first OFDM symbol i, i+4 th OFDM symbol may carry CRS (RE pattern and sequence of fourth OFDM symbol in the first slot) and so on. Instead of CRS, UE-specific RS may be also used or other known sequence (or preamble) may be used to indicate the starting OFDM symbol of the partial subframe.

FIG. 20 shows another example of a CRS pattern for a partial subframe according to an embodiment of the present invention. FIG. 20 shows that the partial subframes starts at third OFDM symbol of the subframe, and accordingly, the length of the partial subframe may be determined as 12 OFDM symbols.

FIG. 21 shows another example of a CRS pattern for a partial subframe according to an embodiment of the present invention. FIG. 21 shows that the partial subframes starts at fifth OFDM symbol of the subframe, and accordingly, the length of the partial subframe may be determined as 10 OFDM symbols.

The issue with blind detection based on RS to determine the length of the partial subframe is the reliability. When the interference is high, the detection reliability may be considerably degraded. In that case, combining with blind detection based on PDCCH may be also considered to improve the reliability. More specifically, the UE may assume that the cell is on-state if PDCCH is detected (for the UE either in USS or CSS) from PCell or SCell itself and also detect CRS on unlicensed carrier. In terms of detecting PDCCH, the UE may also include PDCCH detection comes in later subframe (for example, PDCCH comes in the next subframe where CRS is detected in previous subframe) or in later timing (for example, PDCCH comes in the next subframe of PCell whereas CRS is detected in SCell in current time).

To enhance the reliability of blind detection of the partial subframe based on RS, it may be assumed that there will be at least one full subframe right after the partial subframe. In other words, the UE may perform blind detection over about 2 subframes rather than one subframe to detect the partial subframe. For example, if the UE knows that the subframe is a full subframe via DCI or by other means, the UE may assume that there will be preceding partial subframe before the full subframe. Knowing this information may improve the detection probability at the UE side. Furthermore, if the UE detects the partial subframe, with this constraints, the UE may assume that there will be full subframe following the partial subframe. Thus, without any indication from the network, the UE may be safely assume a full subframe without blind detection. This may be verified by reading CRS or UE-specific RS. More specifically, this implies that a UE detects full subframe and a UE may attempt to search the partial subframe once the first full subframe is detected. In such a case, the partial subframe may be assumed to be transmitted with preamble or synchronization signal to enhance the reliability. To support this, a UE may have to buffer at least two subframes, as it should go back to previous subframe for blind search.

Moreover, to minimize the blind detection, a higher layer signaling to indicate possible OFDM symbol length used for the partial subframe may be considered which may be different per UE. The network may schedule PDSCH to the UE in the partial subframe based on the higher layer configuration, even if the available length of the partial subframe is longer than the configured value. For example, if the network has three UEs (UE1, UE2, and UE3) where UE1, UE2 and UE3 are respectively configured with 1 slot, 10 OFDM symbols, and 12 OFDM symbols for the length of the partial subframe, the network may schedule data to UE1 if the length of the partial subframe (after channel acquisition) is smaller than 10, and may schedule to UE2 if the length of the partial subframe is smaller than 12, and so on. Another approach is to schedule data to a UE regardless of the actual length of the partial subframe, though the PDSCH for each UE is mapped to the length per configured value.

Particularly with UE-specific RS based scheduling, the UE which is scheduled with PDSCH in the partial subframe may assume that the next subframe will carry PDSCH scheduled to the UE. This is to improve the reliability of blind detection based on UE-specific RS. The UE may utilize two subframes of UE-specific RS to blindly detect the transmission rather than relying on only one subframe.

Second, RS patterns for blind detection of the partial subframe in unlicensed carrier, which starts at the first OFDM symbol of the subframe and ends at the middle of the subframe, are described. Based on RS patterns described below, the length of the partial subframe may be determined.

(1) Approach B-1: Similar to Approach A-1

Similar to Approach A-1 descried above, if the UE detects CRS, the UE may attempt to detect CRS in each OFDM symbol where CRS may be transmitted to detect the partial subframe. To verify the detected number of OFDM symbols, the CRS sequence generation may be done such a way that the last CRS (e.g., first OFDM symbol in the second slot with 11 OFDM symbol size of the partial subframe) uses sequence of l=4 and second slot. The number of OFDM symbols by detected CRS may be different. For example, 10 OFDM symbols may be assumed in case that the UE detects CRS in first and fourth OFDM symbol in the first slot and first OFDM symbol in the second slot.

FIG. 22 shows another example of a CRS pattern for a partial subframe according to an embodiment of the present invention. FIG. 22 corresponds to a case that the partial subframe is achieved in normal CP by 11 OFDM symbols when the UE detects CRS in the first and fourth OFDM symbol in the first slot and first OFDM symbol in the second slot.

FIG. 23 shows another example of a CRS pattern for a partial subframe according to an embodiment of the present invention. FIG. 23 corresponds to a case that the partial subframe is achieved in normal CP by 7 OFDM symbols when the UE detects CRS in the first and fourth OFDM symbol in the first slot only.

FIG. 24 shows another example of a CRS pattern for a partial subframe according to an embodiment of the present invention. FIG. 24 corresponds to a case that the partial subframe is achieved in normal CP by 4 OFDM symbols when the UE detects CRS in the first OFDM symbol in the first slot only.

The drawing, which corresponds to a case that the partial subframe is achieved in normal CP by 14 OFDM symbols when the UE detects CRS in the first and fourth OFDM symbol in the first slot and first and fourth OFDM symbol in the second slot, is omitted, since the partial subframe is a full subframe.

Even though the embodiment of the present invention described above has been discussed based on existing LTE RS pattern, when a new RS pattern is used for LTE-U, the same principle may be applicable for the newly defined RS pattern. Also, if a new control channel is introduced for LTE-U, the same principle used for PDCCH or EPDCCH may be applied to the new control channel.

(2) Approach B-2: Similar to Approach A-3

Similar to Approach A-3 descried above, the partial subframe ends at the last OFDM symbol (or two OFM symbols before the last OFDM symbol) with CRS sequence used in fourth OFDM symbol in the second slot. Based on this, the UE may expect CRS transmission and determine the length of the partial subframe.

FIG. 25 shows another example of a CRS pattern for a partial subframe according to an embodiment of the present invention. FIG. 25 shows that the partial subframes ends at $10^{th}$ OFDM symbol of the subframe, assuming that CRS pattern of fourth OFDM symbol in the second slot is used two OFDM symbols before the last OFDM symbol of the partial subframe. Accordingly, the length of the partial subframe may be determined as 10 OFDM symbols.

FIG. 26 shows another example of a CRS pattern for a partial subframe according to an embodiment of the present invention. FIG. 26 shows that the partial subframes ends at $8^{th}$ OFDM symbol of the subframe, assuming that CRS pattern of fourth OFDM symbol in the second slot is used two OFDM symbols before the last OFDM symbol of the partial subframe. Accordingly, the length of the partial subframe may be determined as 8 OFDM symbols.

(3) Approach B-3: Approach A-3+Mirroring

Another option is to start the first CRS in the last OFDM symbol or known sequence (or preamble) in the last OFDM symbol and then mirrored CRS RS pattern is used in the rest. By detecting the first CRS or known sequence, the UE may determine the length of the partial subframe.

FIG. 27 shows another example of a CRS pattern for a partial subframe according to an embodiment of the present invention. FIG. 27 shows that the partial subframes ends at $11^{th}$ OFDM symbol of the subframe, and the mirrored CRS pattern is used. Accordingly, the length of the partial subframe may be determined as 11 OFDM symbols.

FIG. 28 shows another example of a CRS pattern for a partial subframe according to an embodiment of the present invention. FIG. 28 shows that the partial subframes ends at sixth OFDM symbol of the subframe, and the mirrored CRS pattern is used. Accordingly, the length of the partial subframe may be determined as 6 OFDM symbols.

(4) Approach B-4: Approach B-2+End CRS

Another approach is to use CRS pattern and sequence of fourth OFDM symbol in the second slot in the last OFDM symbol, while keeping the rest CRS pattern as in current specification. For example, if the length of the partial subframe is 10 OFDM symbols, the CRS sequence generation in the first slot is same as the current CRS pattern, whereas the CRS sequence generation in the first OFDM symbol in the second slot follows fourth OFDM symbol in the second slot. That is, only the CRS sequence used in the last OFDM symbol of the partial subframe is based on fourth OFDM symbol in the second slot.

FIG. 29 shows another example of a CRS pattern for a partial subframe according to an embodiment of the present invention. The CRS pattern shown in FIG. 29 is the same as the CRS pattern shown in FIG. 25, except that only the last CRS sequence, i.e. the first OFDM symbol in the second slot, follows 1=4, and the second slot.

FIG. 30 shows another example of a CRS pattern for a partial subframe according to an embodiment of the present invention. The CRS pattern shown in FIG. 30 is the same as the CRS pattern shown in FIG. 26, except that only the last CRS sequence, i.e. the sixth OFDM symbol in the first slot, follows 1=4, and the second slot.

Similar approach may be applied to other RS such as demodulation RS (DMRS). Similarly for UL transmission, if the partial subframe due to channel sensing is used for UL transmission, the size of the partial subframe may be detected based on RS pattern or known sequence in the starting OFDM symbol. For example, if the network detects only DMRS pattern in the second slot, the network may assume that the partial subframe (UL) is one slot duration (if it is the starting of transmission), and if the network detects two DMRS in both slots, the network ma assume full subframe length for UL transmission. Similarly, for the partial subframe which may be used in the end of the transmission, if the network detects only DMRS in the first slot, the network may assume that the length of the partial subframe is 1 slot duration, whereas if the network detects both DMRS in both slots, the network may assume that the length of the partial subframe is full subframe.

Further, the above description has been mainly discussed based on one or two CRS antenna port, the same concept may be applied to CRS antenna port 2 and 3 without loss of generality.

Particularly for the measurement, if the UE performs measurement based on blind detection, the accuracy of measurement may be considerably deteriorated depending on the interference level as well as the number of subframes where RS was transmitted. Thus, at least for the measurement, the UE may store a few subframes in advance and perform measurement if the indication of "actual transmission or actual ON subframes" is received in a subframe. For example, the UE may store 5 ms raw data (may be only RS REs only for the measurements) and then based on L1 signaling of subframe ON/OFF of past subframes, the UE may take some data from the ON-subframe(s). The similar concept may be applied to channel state information (CSI) feedback as well regardless of whether CRS or CSI-RS is used for feedback. Even though the entire data can be huge, storing REs used for channel estimation and/or tracking may be minimal. Thus, a UE may be able to store the data for the measurement in unlicensed carrier.

Hereinafter, automatic gain control (AGC) settling issue handling according to an embodiment of the present invention is described. Due to UE RF characteristics and limitations, if there is no continuous data reception at a frequency, it may take a while to settle down UE AGC and be ready for data reception (even without assuming frequency tuning). There may be multiple components which may impact the UE preparation time. In other words, there may be a latency between T0 where the medium becomes available to the time T1 when the UE can start to receive PDSCH within the current LTE timeline requirement (e.g., PDSCH decoding within 1 ms, HARQ-ACK preparation within 4 ms, etc). The followings are examples of components which may impact the UE preparation time.

Frequency switching time: If the UE is not tuned on the LTE-U frequency or LTE-U frequency may change depending on the channel availability, frequency switching time is needed. Typically, this is assumed around 1 ms.

Tracking latency: For returning the time/frequency tracking, some delay is assumed. Typically, this can be less than ~100 us to a few ms. Assuming the UE is performing frequency/time tracking against PCell, the correction may not take so long. In this case, this may be also assumed as zero.

AGC setting: typically it may take more than 70 us to a few OFDM symbols.

Assuming that CRS is used for tracking and ACG settling, this means that a UE needs to receive CRS at least a few OFDM symbols or subframes before the data transmission actually occurs. This gap may be referred to as "UE_PREP_GAP". Depending on UE configuration or implementation, the needed gap may be different. Thus, the gap of the worst case may be assumed and then data transmission may occur after the gap of the worst case since the medium becomes available. In this case, to enable UE preparation, necessary signals such as CRS may need to be transmitted. For the convenience, "ACTIVE TIME" may be defined when the eNB can transmit any signal since the medium becomes idle and "INACTIVE TIME" may be defined when the eNB cannot transmit any signal as either the medium is busy or not usable due to coordination or other reason(s). The necessity of UE_PREP_GAP also depends on the interval between two consecutive ACTIVE TIME durations. For example, if the eNB becomes INACTIVE TIME only for very short time such as 5 ms, additional delay for UE_PREP_GAP may not be necessary. Also, if ACTIVE TIME is very short so that the UE is not able to be ready, then UE_PREP_GAP may be necessary even though the interval between two ACTIVE TIME durations is very short.

Alternatively, the necessity of UE_PREP_GAP may be determined based on the interval between actual scheduling to the specific UE which may also include DRS transmission or any common data scheduling. In other words, if a UE attempts to read the channel only if it is scheduled assisted by the licensed carrier, the necessity of the gap may be determined based on the inactivity timer from the UE perspective rather than from the network perspective. For the simplicity, the gap may be always assumed if the gap between two consecutive scheduling intervals is larger than T ms/subframes. Also, it may be assumed that the gap is necessary when a UE wakes up from DRX or from IDLE. In terms of DRX, it may be triggered depending on the DRX cycle that the UE is configured with. If ACTIVE TIME duration and INACTIVE TIME duration/occurrence change dynamically, to guarantee UE performance, the following may be considered.

Option 1: One instance of ACTIVE TIME may not be less than worst case of UE_PREP_GAP. In other words, the UE should be able to perform necessary functionality in one ACTIVE_TIME instance. For example, if the worst gap size is 2 ms, ACTIVE TIME duration should be larger than 2 ms. Once the network acquires the medium, the network should transmit signals more than 2 ms for the UE to perform necessary functions if there is data to the UE or the UE needs to perform measurement.

Option 2: If the option 1 cannot be assured, the interval between two consecutive ACTIVE_TIME should be less than allowable gap not to lose tracking and AGC settling. For example, if the duration between ACTIVE TIME is less than 5 ms as in TDD DL/UL configuration 0, the UE may be able to keep up tracking and AGC without any issue. In this case, ACTIVE TIME may be very short (such as 1 ms).

As it may not be easily feasible to guarantee the option 2 via contention-based medium access mechanism, the option 1 is focused. For a convenience, let's assume 5 ms as the minimum duration of one ACTIVE TIME (i.e., the network will become ACTIVE at least 5 ms once it is activated). During the ACTIVE TIME, in terms of PDSCH transmission, PDSCH transmission may always start after UE_PREP_GAP, or PDSCH transmission may start anytime during ACTIVE TIME. When PDSCH transmission always starts after UE_PREP_GAP, obviously the system resource is wasted. Also, how to determine UE_PREP_GAP becomes an issue. If the worst gap is used, spectral efficiency may be considerably degraded. Thus, a UE may have to inform the network the required UE_PREP_GAP so that the network reserves that much before transmitting PDSCH to the UE.

When PDSCH transmission starts anytime during ACTIVE TIME, without changing current UE behaviour, a UE may not receive PDSCH during the first few OFDM symbols or subframes (for UE_PREP_GAP time). This may be also considerable impact on the user throughput. Thus, UE buffering data and delaying the processing until it becomes ready may be proposed. For example, if UE_PREP_GAP is 2 ms, the UE can buffer raw data for 2 ms. However, this may not be applicable if AGC is not settled or frequency switching has not been occurred. Thus, at least for AGC/frequency switching time (if needed) may be considered, which will be discussed below.

For tracking purpose, a UE may store raw data and then delay UE processing for UE_PREP_GAP delay. To reduce UE processing time budget, HARQ-ACK timing may be shifted to UE_PREP_GAP delay+current HARQ-ACK budget. For example, in FDD mode, HARQ-ACK timing may be shifted to n+6 for PDSCH transmitted at n-th subframe, assuming 2 ms of UE_PREP_GAP. The shift value may be prefixed based on the worst case, and thus, a UE serviced by LTE-U carrier can transmit HARQ-ACK following new processing time budget regardless of UE_PREP_GAP. Or, a UE may request the delay of HARQ-ACK timing. Assuming m is the delay to handle UE_PREP_GAP, the HARQ-ACK timing in FDD may become n+4+m for PDSCH transmitted at n-th subframe. In TDD, HARQ-ACK, transmitted at n-th subframe, may include HARQ-ACK(s) for PDSCH transmitted at n-k-m-th subframe (where k is defined in current specification for TDD configurations). For TDD/FDD CA case, the same concept may be applied to the new HARQ timing.

Furthermore, to assist scheduling complexity and power efficiency as well as tracking, it may be considered that data may be scheduled with DRS which may include at least one of the following information.

DCI indicator: DRS may include the information on whether a UE will be scheduled in between current DRS and the next DRS occasion. Since there are too many UEs possible, UEs may be grouped either based on cell radio network temporary identity (C-RNTI) or other means to indicate this. Common data if transmitted via LTE-U may have a separate indication. If a UE discovers that there is no scheduling intended for the UE in the next occasion, it may skip attempting reading control channel for the interval until next DRS occasion. This may also include some multicast, broadcast traffic information as well.

Measurement RS: RS used for measurement may be included in DRS or data/control channel associated/transmitted with DRS.

Multicast traffic control information: similar to SIB-13, multicasting related information may be broadcasted with DRS.

Tracking RS: RS which may be used for tracking may be included in DRS or data/control channel associated/transmitted with DRS. This may or may not be the same to measurement RS.

To handle frequency switching delay, a UE may be requested to prepare data reception at LTE-U such as via activation procedure. When the UE is activated with LTE-U carrier as SCell, the UE may perform frequency switching so that frequency switching delay is not incurred. To handle AGC issue, a UE may assume about 1 OFDM symbol transmission of CRS (or any other signal for AGC setting such as preamble) before PDSCH transmission. For that, the UE may assume that if PDSCH is transmitted at n-th subframe of LTE-U carrier, there is signal transmission at least in the last OFDM symbol of n-1 th subframe. Or, the UE may assume that it may not read the first OFDM symbol when needed. This case may be limited to the first subframe of ACTIVE TIME if needed. If AGC requires more than a few OFDM symbol, it may be generalized to a few OFDM symbols.

FIG. 31 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for receiving, by a user equipment (UE), a downlink signal in an unlicensed carrier in a wireless communication system, the method comprising:

receiving subframe information for the unlicensed carrier via downlink control information (DCI) from a network;

determining that a first subframe is a partial subframe according to the subframe information for the unlicensed carrier, wherein the partial subframe occupies only a part of orthogonal frequency division multiplexing (OFDM) symbols in the first subframe;

determining that a second subframe, which immediately follows the first subframe, is a full subframe, which occupies all of OFDM symbols in the second subframe; and receiving the downlink signal from the network in the unlicensed carrier via the first subframe and the second subframe.

2. The method of claim 1, wherein the partial subframe does not occupy OFDM symbols in a first slot of the first subframe.

3. The method of claim 1, wherein the partial subframe is blindly detected based on a reference signal (RS).

4. The method of claim 3, wherein the RS is one of a cell-specific RS (CRS) or a UE-specific RS.

5. A user equipment (UE) in a wireless communication system, the UE comprising:

a memory;

a transceiver; and a processor, coupled to the memory and the transceiver, that:

controls the transceiver to receive subframe information for an unlicensed carrier via downlink control information (DCI) from a network, determines that a first subframe is a partial subframe according to the subframe information for the unlicensed carrier, wherein the partial subframe occupies only a part of orthogonal frequency division multiplexing (OFDM) symbols in the first subframe, determines that a second subframe, which immediately follows the first subframe, is a full subframe, which occupies all of OFDM symbols in the second subframe, and controls the transceiver to receive the downlink signal from the network in the unlicensed carrier via the first subframe and the second subframe.

6. The UE of claim 5, wherein the partial subframe does not occupy OFDM symbols in a first slot of the first subframe.

7. The UE of claim 5, wherein the partial subframe is blindly detected based on a reference signal (RS).

8. The UE of claim 7, wherein the RS is one of a cell-specific RS (CRS) or a UE-specific RS.

* * * * *